United States Patent
Shimauchi et al.

(10) Patent No.: US 10,750,080 B2
(45) Date of Patent: Aug. 18, 2020

(54) INFORMATION PROCESSING DEVICE, INFORMATION PROCESSING METHOD, AND PROGRAM

(71) Applicant: Sony Corporation, Tokyo (JP)

(72) Inventors: Kazuhiro Shimauchi, Tokyo (JP); Daisuke Tahara, Tokyo (JP); Nobuho Ikeda, Kanagawa (JP); Atsushi Kimura, Tokyo (JP)

(73) Assignee: Sony Corporation, Tokyo (JP)

( * ) Notice: Subject to any disclaimer, the term of this patent is extended or adjusted under 35 U.S.C. 154(b) by 36 days.

(21) Appl. No.: 15/560,704

(22) PCT Filed: Mar. 10, 2016

(86) PCT No.: PCT/JP2016/057653
§ 371 (c)(1),
(2) Date: Sep. 22, 2017

(87) PCT Pub. No.: WO2016/174942
PCT Pub. Date: Nov. 3, 2016

(65) Prior Publication Data
US 2018/0109723 A1    Apr. 19, 2018

(30) Foreign Application Priority Data
Apr. 28, 2015 (JP) .................. 2015-091309

(51) Int. Cl.
*H04N 7/18* (2006.01)
*H04N 5/232* (2006.01)
(Continued)

(52) U.S. Cl.
CPC ......... *H04N 5/23216* (2013.01); *G03B 7/091* (2013.01); *G03B 15/00* (2013.01);
(Continued)

(58) Field of Classification Search
USPC ....................................................... 348/159
See application file for complete search history.

(56) References Cited

U.S. PATENT DOCUMENTS

2011/0157373 A1* 6/2011 Ye ............................ G06T 7/85
348/187
2014/0204000 A1* 7/2014 Sato ...................... H04W 64/00
345/2.3
(Continued)

FOREIGN PATENT DOCUMENTS

JP 2014-241496 A 12/2014
JP 2015-012543 A 1/2015

*Primary Examiner* — Behrooz M Senfi
(74) *Attorney, Agent, or Firm* — Michael Best & Friedrich LLP

(57) ABSTRACT

[Object] To support a user such that the user can easily adjust installation states of a plurality of imaging devices.
[Solution] Provided is an information processing device including an adjustment instruction specification unit configured to specify an instruction regarding adjustment by extracting or arranging elements of the adjustment in accordance with a level of priority of each of the elements for shifting current installation states of a plurality of imaging devices toward appropriate installation states of the plurality of imaging devices.

19 Claims, 20 Drawing Sheets

(51) Int. Cl.
*G03B 37/00* (2006.01)
*G03B 15/00* (2006.01)
*G03B 7/091* (2006.01)
*H04N 5/247* (2006.01)

(52) U.S. Cl.
CPC ......... *G03B 37/00* (2013.01); *H04N 5/23203* (2013.01); *H04N 5/23206* (2013.01); *H04N 5/23222* (2013.01); *H04N 5/23238* (2013.01); *H04N 5/23293* (2013.01); *H04N 5/232939* (2018.08); *H04N 5/247* (2013.01); *H04N 7/181* (2013.01)

(56) References Cited

U.S. PATENT DOCUMENTS

| | | | |
|---|---|---|---|
| 2015/0130838 A1* | 5/2015 | Kasahara | G06K 9/00671 345/633 |
| 2015/0331486 A1* | 11/2015 | Okubo | G06F 3/0346 345/156 |
| 2016/0050367 A1* | 2/2016 | Shimauchi | H04N 5/23238 348/36 |
| 2016/0275683 A1* | 9/2016 | Sakano | G06T 7/80 |
| 2017/0277968 A1* | 9/2017 | Ikeda | G06T 7/60 |

* cited by examiner

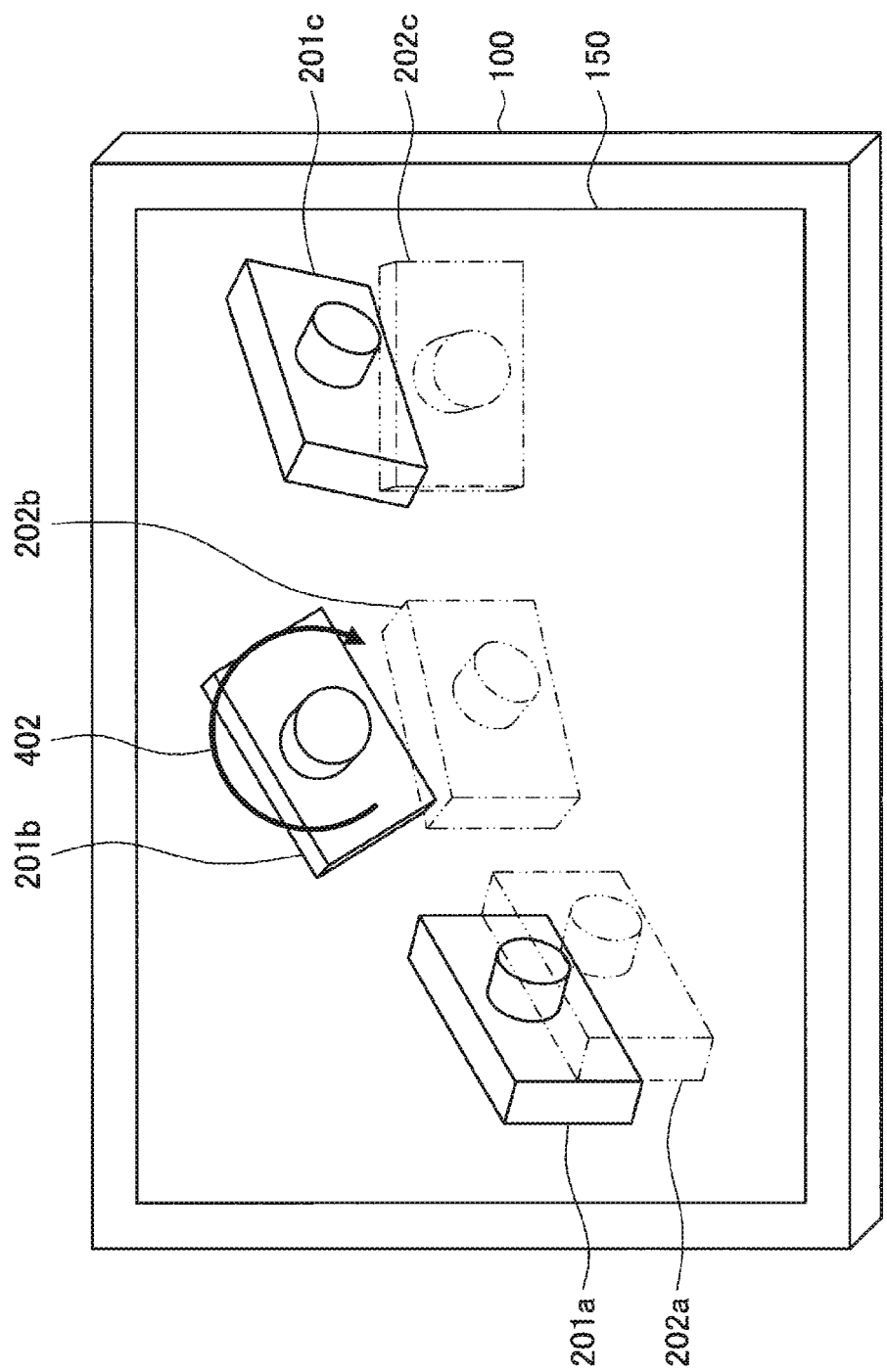

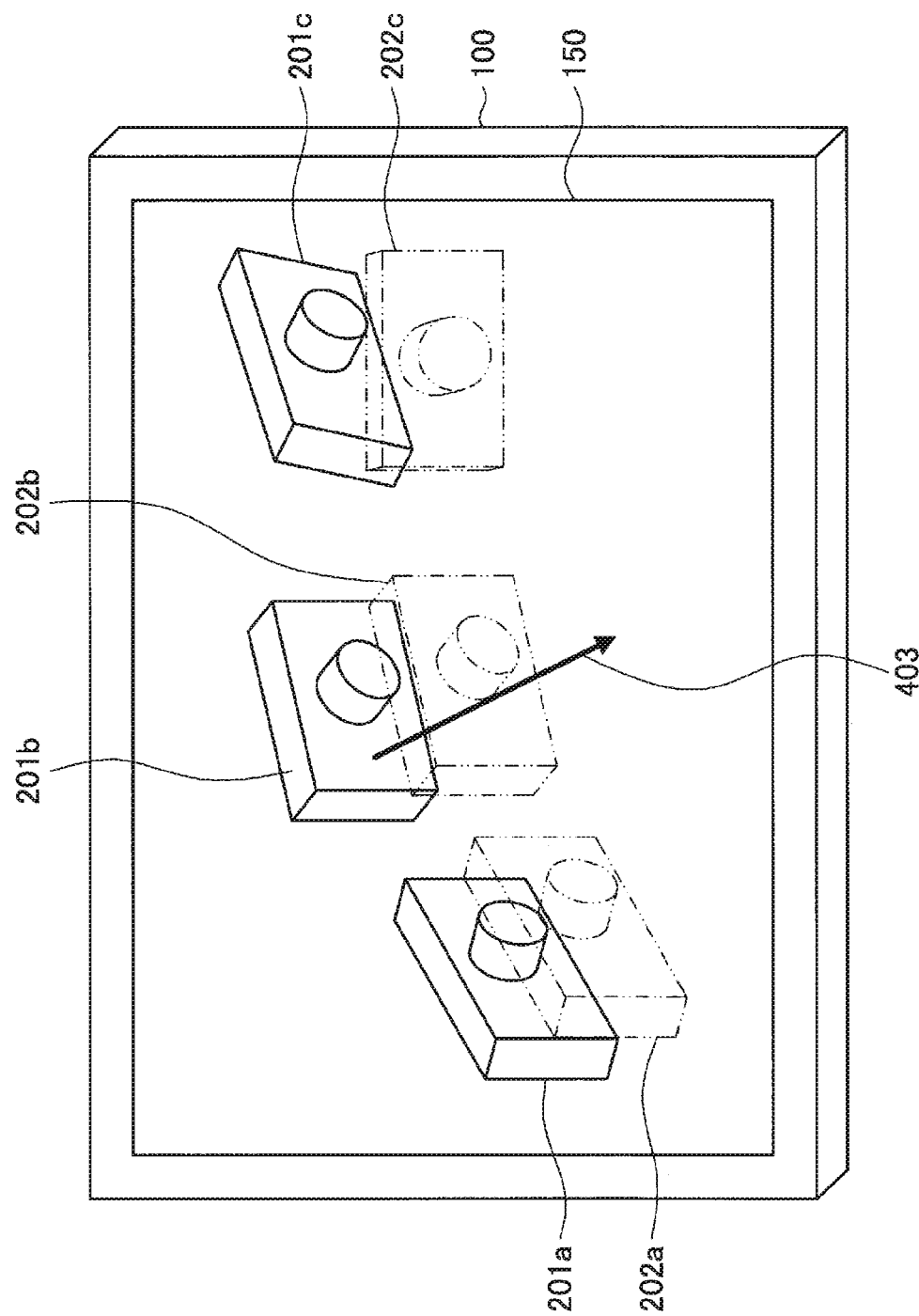

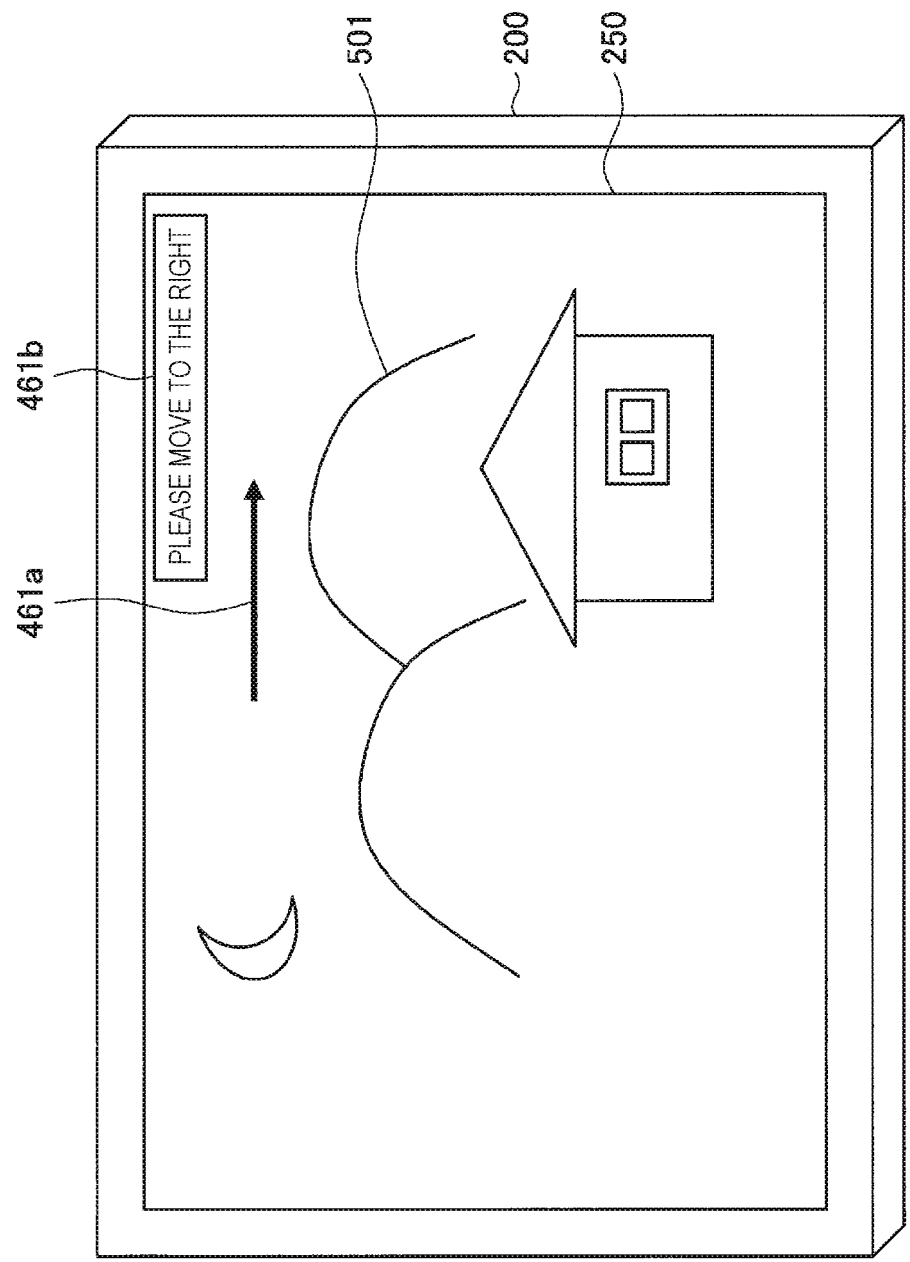

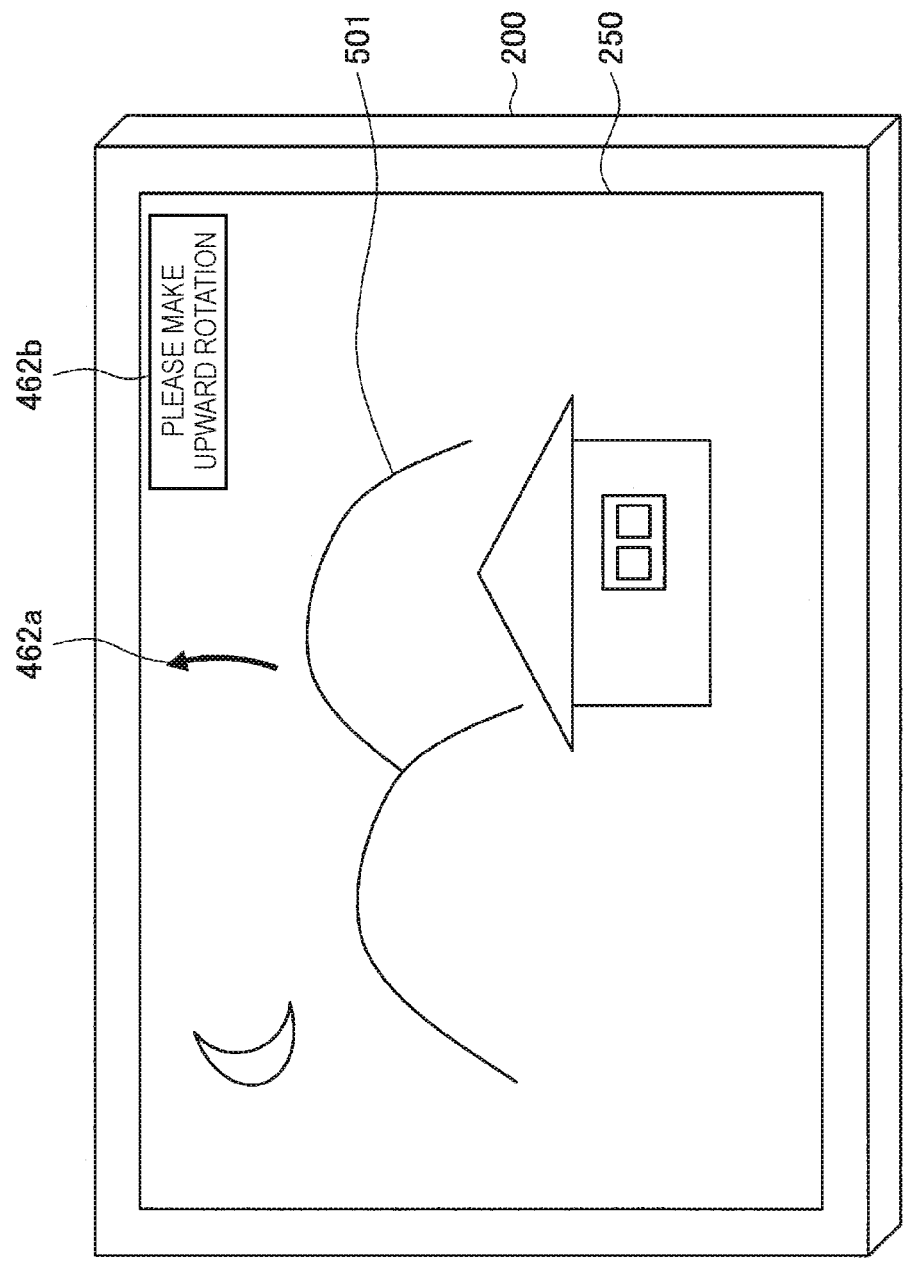

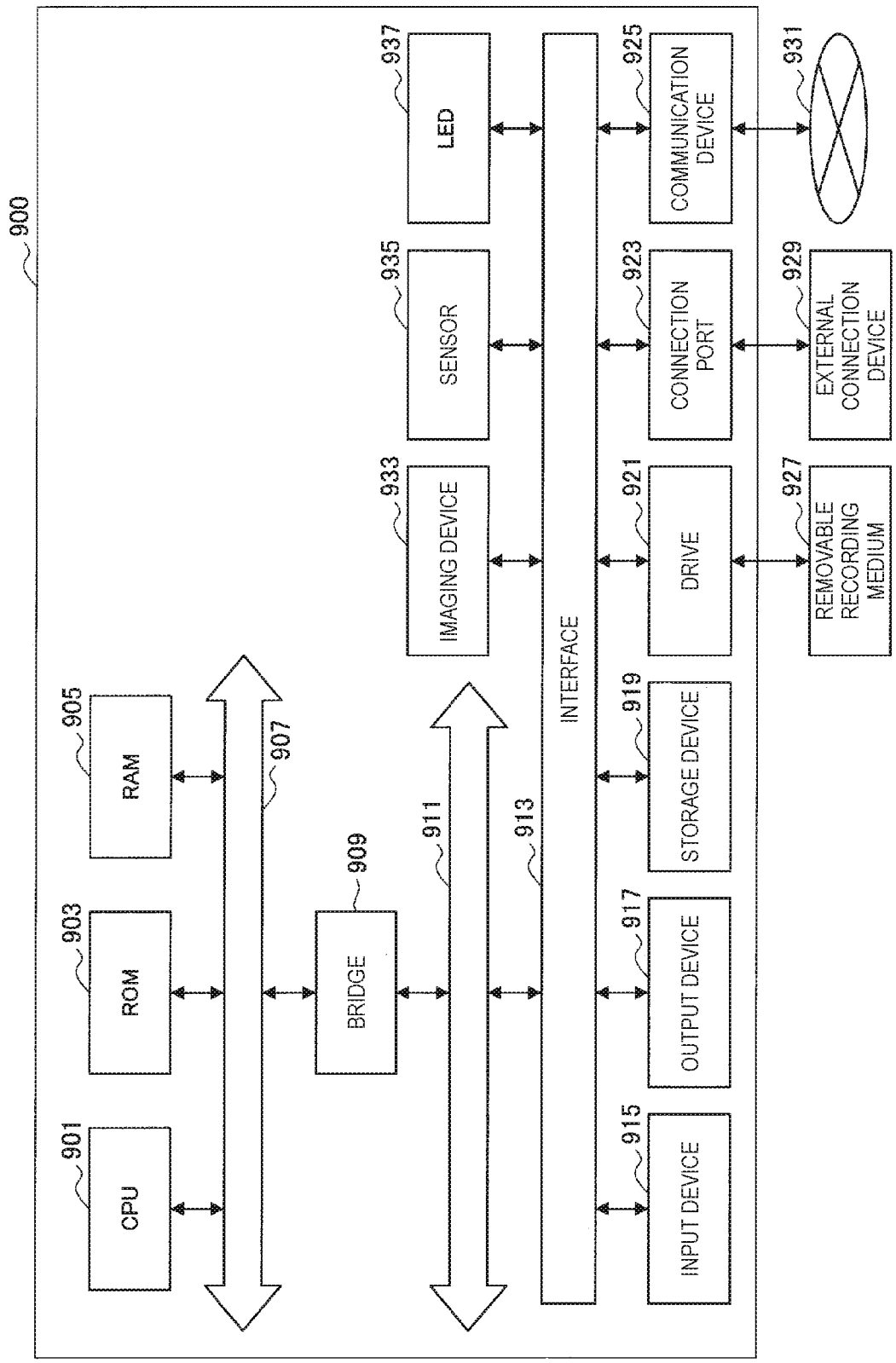

INFORMATION PROCESSING DEVICE, INFORMATION PROCESSING METHOD, AND PROGRAM

TECHNICAL FIELD

The present disclosure relates to an information processing device, an information processing method, and a program.

BACKGROUND ART

A technology for presenting information regarding installation states such as installation positions and attitudes of a plurality of imaging devices, for example, to integrate images captured by the plurality of imaging devices has been developed. Patent Literature 1 mentioned below discloses an information processing device that includes an acquisition unit that acquires candidate states that are installation state candidates of a plurality of imaging states and a control unit that performs control of presenting the candidate states. According to the technology, a user can be presented with an appropriate installation state of each imaging device.

CITATION LIST

Patent Literature

Patent Literature 1: JP 2014-241496A

DISCLOSURE OF INVENTION

Technical Problem

However, while appropriate installation states of the imaging devices are presented in the technology disclosed in Patent Literature 1 mentioned above, it may be difficult for a user to specifically ascertain how each imaging device can be put in the appropriate installation state, and effort is required to adjust installation states of the imaging devices.

Therefore, the present disclosure proposes a novel and improved information processing device, information processing method, and program that support easy adjustment of installation states of a plurality of imaging devices.

Solution to Problem

According to the present disclosure, there is provided an information processing device including: an adjustment instruction specification unit configured to specify an instruction regarding adjustment by extracting or arranging elements of the adjustment in accordance with a level of priority of each of the elements for shifting current installation states of a plurality of imaging devices toward appropriate installation states of the plurality of imaging devices.

In addition, according to the present disclosure, there is provided an information processing method including: specifying, by a processor, an instruction regarding adjustment by extracting or arranging elements of the adjustment in accordance with a level of priority of each of the elements for shifting current installation states of a plurality of imaging devices toward appropriate installation states of the plurality of imaging devices.

In addition, according to the present disclosure, there is provided a program causing a computer to function as: an adjustment instruction specification unit configured to specify an instruction regarding adjustment by extracting or arranging elements of the adjustment in accordance with a level of priority of each of the elements for shifting current installation states of a plurality of imaging devices toward appropriate installation states of the plurality of imaging devices.

According to the present disclosure, an instruction regarding adjustment is specified in accordance with a level of priority, and thus a user can effectively shift a plurality of imaging devices toward appropriate installation states in accordance with the instruction.

Advantageous Effects of Invention

According to the present disclosure described above, it is possible to support easy adjustment of installation states of a plurality of imaging devices.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 9B is a diagram illustrating an example in which adjustment instructions are displayed in order of levels of priority from highest to lowest in the first embodiment.

FIG. 9C is a diagram illustrating an example in which adjustment instructions are displayed in order of levels of priority from highest to lowest in the first embodiment.

FIG. 16A is a diagram illustrating a modified example of the first embodiment in which an instruction is displayed on an output screen of a live view image captured by an imaging device.

FIG. 16B is a diagram illustrating a modified example of the first embodiment in which an instruction is displayed on an output screen of a live view image captured by an imaging device.

FIG. 20 is a block diagram illustrating an example of a hardware configuration of an information processing device according to an embodiment of the present disclosure.

MODE(S) FOR CARRYING OUT THE INVENTION

Figure 1:
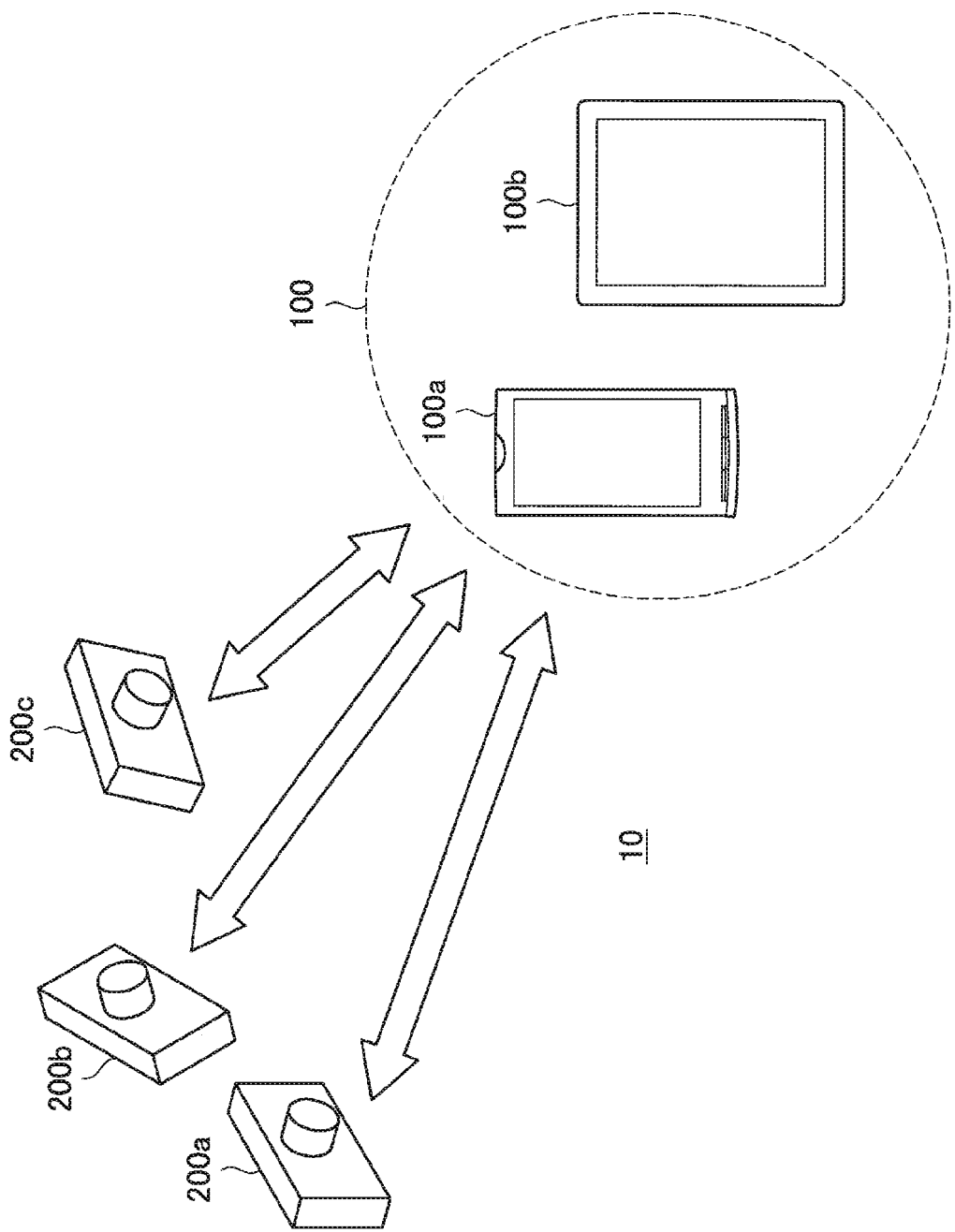
FIG. 1 is an illustrative diagram showing an example of a schematic configuration of an information processing system 10 according to a first embodiment.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Note that description will be provided in the following order.
1. First embodiment
1-1. Configuration of system
1-2. Details of process
1-3. Examples of output
2. Second embodiment
3. Third embodiment
4. Example of hardware configuration
5. Conclusion
1. First Embodiment
[1-1. Configuration of System]
(Configuration of information processing system)

FIG. 1 is a diagram showing an example of a schematic configuration of an information processing system 10 according to a first embodiment. Referring to FIG. 1, the information processing system 10 may include a terminal device 100 and imaging devices 200, The terminal device 100 is an example of an information processing device. Although a smartphone 100a and a tablet 100b are illustrated as examples of the terminal device 100 in FIG. 1, the terminal device 100 may also include devices such as a personal computer, a recorder, and a game device. The terminal device 100 may include a processing circuit, a communication device, and an output device. The terminal device 100, for example, may receive information such as a captured image, a current installation state, and the like from the imaging devices 200 with the communication device, execute a process with respect to the installation states of the imaging devices 200 on the basis of the information received by the processing circuit, and output a processing result on a display or the like included in the output device. In addition, the terminal device 100 may transmit the processing result to the imaging devices 200 using the communication device. Further, the terminal device 100 may have an imaging function for imaging the imaging devices 200 and the like, and may output an image captured by the terminal device 100 superimposed on the processing result via the output device.

The imaging devices 200 are devices with imaging functions. Although digital cameras are illustrated as examples of the imaging devices 200a to 200c in FIG. 1, the imaging devices 200 may also include a variety of devices having the imaging function, such as a smartphone, a tablet, a game device, a wearable device, etc. The imaging devices 200 each include an image sensor, an optical system relating to the image sensor, a drive system, and an image processing circuit. In addition, each of the imaging devices 200 may further include a communication device for transmitting and receiving image data, an installation state, and the like to and from the terminal device 100, a sensor for detecting an installation position and an attitude of the imaging device 200, a display for outputting internally generated information or information received from the terminal device 100, an output device such as a speaker and a light emitting diode (LED), and an input device for receiving operations of a user such as through a button, a touch panel, and the like. Note that, the terminal device 100 according to the present embodiment can also be used as an imaging device 200.

Here, the publication of JP 2014-241496A discloses the technology for presenting appropriate installation states to a user by calculating the appropriate installation states of a plurality of imaging devices. However, only the appropriate installation states of the plurality of imaging devices are presented and a specific adjustment method is not presented. For that reason, work of adjusting the appropriate installation states of the imaging devices is difficult.

Therefore, the information processing system 10 according to an embodiment of the present disclosure specifies an adjustment instruction for shifting a plurality of imaging devices that are in current installation states toward appropriate installation states in order of levels of priority of elements. For example, in a case in which a user adjusts installation states of the plurality of imaging devices 200 to appropriate installation states, the information processing system 10 outputs elements (movement direction, rotation direction, and the like) to be adjusted by priority to the terminal device 100 and the like and specifies instruction information to be presented to the user. Thus, the user can easily shift the imaging devices toward the appropriate installation states by following the instruction information output to the terminal device 100 and the like when adjusting the installation states of the imaging devices. Configurations of the terminal device 100 and the imaging devices 200 for realizing the information processing system 10 according to an embodiment of the present disclosure will be described below.

(Terminal device)

Figure 2:
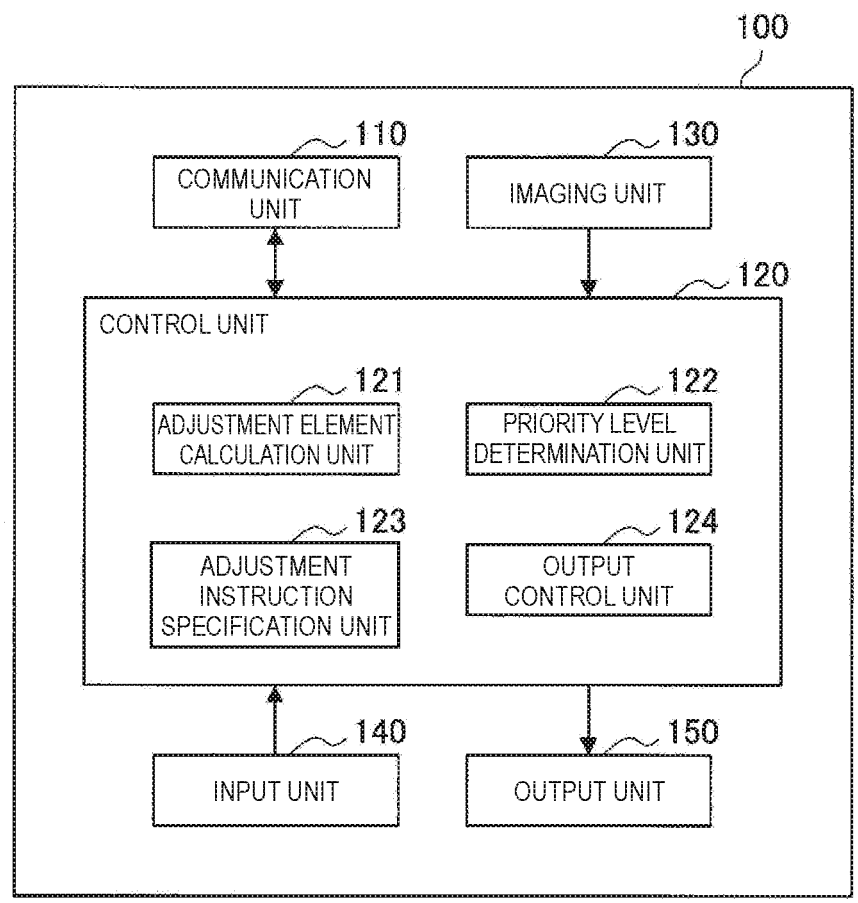
FIG. 2 is a block diagram showing an example of a functional configuration of a terminal device according to the first embodiment.

FIG. 2 is a block diagram showing an example of a functional configuration of the terminal device 100 according to the first embodiment. Referring to FIG. 2, the terminal device 100 includes a communication unit 110, a control unit 120, an imaging unit 130, an input unit 140, and an output unit 150.

The communication unit 110 is a communication means of the terminal device 100 and performs various types of communication with external devices via a network in a wireless or wired manner (or directly). The communication unit 110 communicates with, for example, the imaging devices 200. Specifically, the communication unit 110 may receive information including current installation states of the imaging devices 200 and/or images captured by the imaging devices 200 from the imaging devices 200, and transmit information including an instruction to adjust the imaging devices 200 to the imaging devices 200. Furthermore, the communication unit 110 may communicate with devices other than the imaging devices 200. The communication unit 110 may provide the received information to the control unit 120 and transmit information acquired from the control unit 120 to external devices including the imaging devices 200.

The control unit 120 controls operations of the communication unit 110, the imaging unit 130, the input unit 140, and the output unit 150 and operations of other functional units included in the terminal device 100. More specifically, the control unit 120 executes processes on the basis of various kinds of information obtained from the communication unit 110, the imaging unit 130, and/or the input unit 140 and outputs results of the processes to the communication unit 110 and/or the output unit 150. The control unit 120 is realized by processing circuits such as a CPU and the like included in the terminal device 100. In addition, the control unit 120 can include an adjustment element calculation unit 121, a priority level determination unit 122, an adjustment instruction specification unit 123, and an output control unit 124. Note that functions of the various functional units included in the control unit 120 will be described below.

The adjustment element calculation unit 121 includes a function of acquiring and calculating current installation states and appropriate installation states of the imaging devices 200. The adjustment element calculation unit 121 may acquire information indicating a current installation state and an appropriate installation state of an imaging device 200 from another device (e.g., another imaging device 200) via the communication unit 110. In addition, the adjustment element calculation unit 121 may calculate an appropriate installation state of an imaging device 200 on the basis of information indicating a current installation state acquired from the imaging device 200. Furthermore, the adjustment element calculation unit 121 may calculate an amount of adjustment of each adjustment element using the current installation state and appropriate installation state of the imaging device 200. The adjustment element calculation unit 121 outputs information of the calculated amount of adjustment and the like to the priority level determination unit 122 and the adjustment instruction specification unit 123. Note that, although the adjustment element calculation unit 121 included in the terminal device 100 acquires/calculates each installation state and calculates an amount of adjustment of each adjustment element in the present embodiment, the terminal device 100 may acquire each installation state and each amount of adjustment acquired/calculated by an external device in advance from the external device in another embodiment. In that case, the terminal device 100 may not necessarily include the adjustment element calculation unit 121.

The priority level determination unit 122 determines a level of priority of each adjustment element for shifting the imaging device 200 from a current installation state toward an appropriate installation state. Although a detailed process thereof will be described below, the priority level determination unit 122 determines a level of priority on the basis of a parameter calculated for each element with respect to adjustment. The priority level determination unit 122 outputs a calculated level of priority to the adjustment instruction specification unit 123. Note that, although the priority level determination unit 122 included in the terminal device 100 determines levels of priority in the present embodiment, levels of priority of adjustment elements may be, for example, determined in advance, stored in a memory or storage, and read in another embodiment. In that case, the terminal device 100 may not necessarily include the priority level determination unit 122.

The adjustment instruction specification unit 123 specifies an instruction regarding adjustment by extracting or arranging the adjustment elements in accordance with the levels of priority. Although a detailed process thereof will be described below, in adjustment in which the imaging device 200 is shifted from the current installation state toward the appropriate installation state, the adjustment instruction specification unit 123 extracts at least one adjustment element to be presented to a user or arranges a plurality of elements in accordance with levels of priority determined by the priority level determination unit 122, and then specifies an instruction regarding the adjustment. The adjustment instruction specification unit 123 outputs the specified instruction in accordance with the levels of priority to the Output control unit 124.

The output control unit 124 controls output of an instruction regarding adjustment specified by the adjustment instruction specification unit 123 via an output device such as a display or a speaker realized by the output unit 150 of the terminal device 100 or a similar output device thereto included in another device. Although a detailed process thereof will be described below, the output control unit 124 may control, for example, conversion of a specified instruction in accordance with the levels of priority into an image or a sound and output of the result. In addition, the output control unit 124 may control superimposition output of an object created using computer graphics (CG) indicating the current installation state or the appropriate installation state of the imaging device 200 or a display indicating an instruction on a live view image acquired by the imaging unit 130, which will be described below, and displayed on a display included in the output unit 150. In this case, the live view image can include one or the plurality of imaging devices 200 that are adjustment targets.

The imaging unit 130 generates captured images by capturing, for example, the imaging devices 200 and the like as subjects. The generated captured images may be displayed on the display included in the output unit 150 as live view images, or stored in the memory, the storage, or the like as moving image content. The imaging device outputs the generated captured images to the control unit 120. The imaging unit 130 may be realized by an imaging module that generates image data in the terminal device 100. Note that, although the imaging unit 130 is included in the terminal device 100 in the example illustrated in FIG. 2, the imaging unit 130 may be realized by an external device. In that case, the communication unit 110 receives captured image data from the external device.

The input unit 140 detects input operations from the user. The input unit 140 outputs the detected input operations to the control unit 120. The operations can be used in execution of a program. For example, the control unit 120 may perform a predetermined process on the basis of information with respect to an operation input to the input unit 140. The input unit 140 can be realized by an input device of the terminal device 100 such as a button, a touch panel, and the like. In addition, although the input unit 140 is included in the terminal device 100 in the example illustrated in FIG. 2, the input unit 140 may be realized by an external device. In that case, the communication unit 110 receives information indicating input operations of the user from the external device.

The output unit 150 outputs various kinds of information in accordance with control by the control unit 120. The output unit 150 outputs an instruction in the form of an image, a sound, or the like in accordance with, for example, control by the output control unit 124. The output unit 150 may output, for example, an image captured by the imaging unit 130 or an object such as CG superimposed on the captured image. The output unit 150 is realized by an output device such as the display or the speaker of the terminal device 100. In addition, although the output unit 150 is included in the terminal device 100 in the example illustrated in FIG. 2, the output unit 150 may be realized by an external device. In that case, the communication unit 110 transmits control information to be output generated by the output control unit 124 to the external device.

(Imaging device)

Figure 3:
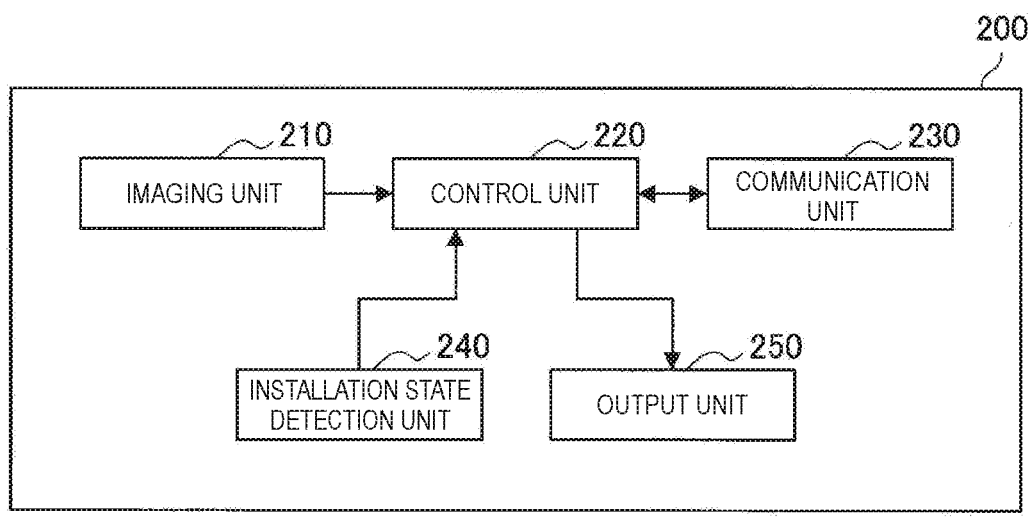
FIG. 3 is a block diagram showing an example of a functional configuration of an imaging device according to the first embodiment.

FIG. 3 is a block diagram showing an example of a functional configuration of the imaging device 200 according to the first embodiment. Referring to FIG. 3, the imaging device 200 includes an imaging unit 210, a control unit 220, a communication unit 230, an installation state detection unit 240, and an output unit 250.

The imaging unit 210 generates a captured image by capturing a subject. The generated captured image may be displayed on the display included in the output unit 250 as a live view image or may be stored in the memory or the storage as moving image content. The imaging device outputs the generated captured image data to the control unit 220. The imaging unit 210 may be realized by an imaging module that generates image data in the imaging device 200.

The control unit 220 controls operations of the imaging unit 210, the communication unit 230, the installation state detection unit 240, the output unit 250, and other functional units of the imaging device 200. More specifically, the control unit 220 executes processes on the basis of various kinds of information obtained from the imaging unit 210, the communication unit 230, and/or the installation state detection unit 240 and outputs results of the processes to the communication unit 230 and/or the output unit 250. The control unit 220 is realized by a processing circuit such as a CPU and the like included in the imaging device 200.

The communication unit 230 is a communication means of the imaging device 200 and performs various types of communication with external devices via a network in a wireless or wired manner (or directly). The communication unit 230 communicates with, for example, the terminal device 100. Specifically, the communication unit 230 may transmit information including a current installation state of the imaging device 200 and/or an image captured by the imaging device 200 to the terminal device 100 and receive information including an instruction regarding adjustment of the imaging device 200 and the like from the terminal device 100. In addition, the communication unit 230 may communicate with devices other than the terminal device 100. The communication unit 230 provides received information to the control unit 220 and transmits information acquired from the control unit 220 to external devices such as the terminal device 100.

The installation state detection unit 240 generates sensor information for detecting a current installation state of the imaging device 200 and outputs sensor information with respect to a result thereof to the control unit 220. The sensor information includes, for example, attitude information obtained by a gyro sensor provided in the imaging device 200, imaging direction information obtained by a geomagnetic sensor, and position information obtained through the Global Positioning System (GPS), a Real Time Kinematic (RTK) system, and Wi-Fi.

The output unit 250 outputs various kinds of information in accordance with control by the control unit 220. The output unit 250 may output, for example, an image captured by the imaging unit 210 along with a display indicating an instruction regarding adjustment received from the terminal device 100. The output unit 250 is realized by an output device such as a display of the imaging device 200.

An LEI) 251 is an example of an output device that realizes the output unit 250. The LED 251 performs display by lighting on the basis of an instruction regarding adjustment received from the terminal device 100. For example, the LED 251 may display a direction in which adjustment is needed or a remaining amount of adjustment in a different mode such as lighting or flicker.

[1-2. Details of Process]

(Calculation/acquisition of each installation state)

Figure 4:
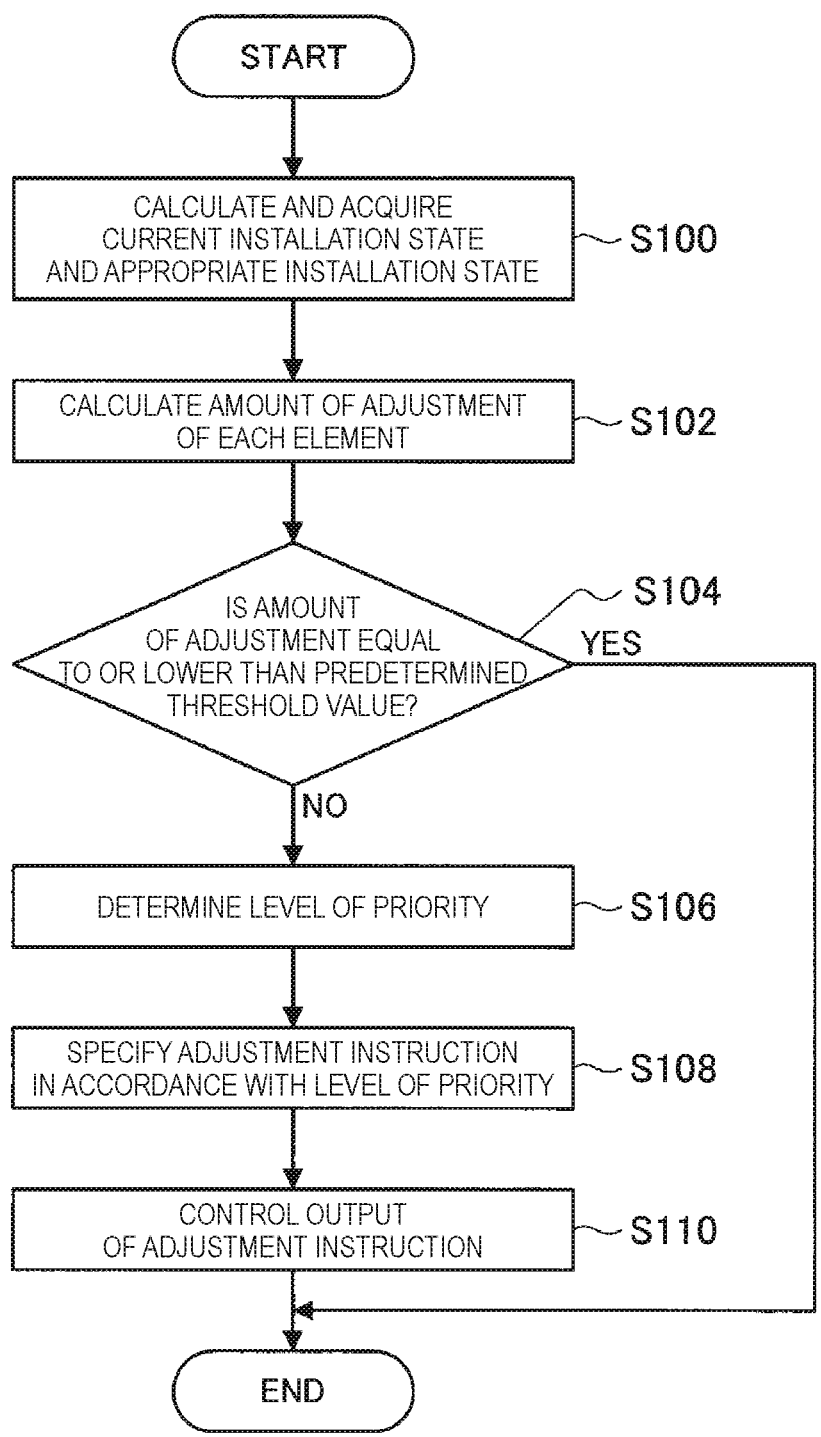
FIG. 4 is a flowchart showing an overview of a process of the terminal device shown in FIG. 3.

FIG. 4 is a flowchart showing an overview of a process of the terminal device 100 shown in FIG. 3. Referring to FIG. 4, first, the adjustment element calculation unit 121 acquires or calculates current installation states and appropriate installation states of the plurality of imaging devices 200 (S100). Here, in the present specification, an installation state refers to at least one of an installation position or an installation attitude of an imaging device 200. In examples to be described below, an installation state includes both an installation position and an installation attitude of an imaging device 200. A current installation state indicates an installation state of an imaging device 200 at a current time point. An appropriate installation state indicates a desirable installation state of the imaging device 200. In a case in which, for example, an integrated image is generated using images captured by the plurality of imaging devices 200 and all of the plurality of imaging devices 200 are in the appropriate installation states, a high-quality integrated image can be generated.

Note that the current installation states and appropriate installation states can be calculated using, for example, the technology disclosed in the publication of JP 2014-241496A. The adjustment element calculation unit 121 may calculate the current installation states and/or the appropriate installation states of the plurality of imaging devices 200. Alternatively, the adjustment element calculation unit 121 may acquire the current installation states and/or the appropriate installation states of the plurality of imaging devices 200 calculated by an external device such as an imaging device 200 via the communication unit 110. The adjustment element calculation unit 121 may acquire, for example, the current installation states detected by the installation state detection units 240 of the imaging devices 200 via the communication unit 110 and calculate the appropriate installation states using the acquired current installation states. In addition the adjustment element calculation unit 121 may calculate/acquire an appropriate setting state of at least one imaging device 200 on the basis of a size of an overlapping area of images captured by the plurality of imaging devices 200 or a deviation in the overlapping area of the images. In a case in which a panoramic image is captured using two imaging devices and an overlapping area of images captured by the imaging devices is smaller than a predetermined reference value, for example, the adjustment element calculation unit 121 may calculate/acquire an appropriate installation state of at least one of the imaging devices in which the overlapping area can be large.

Figure 5:
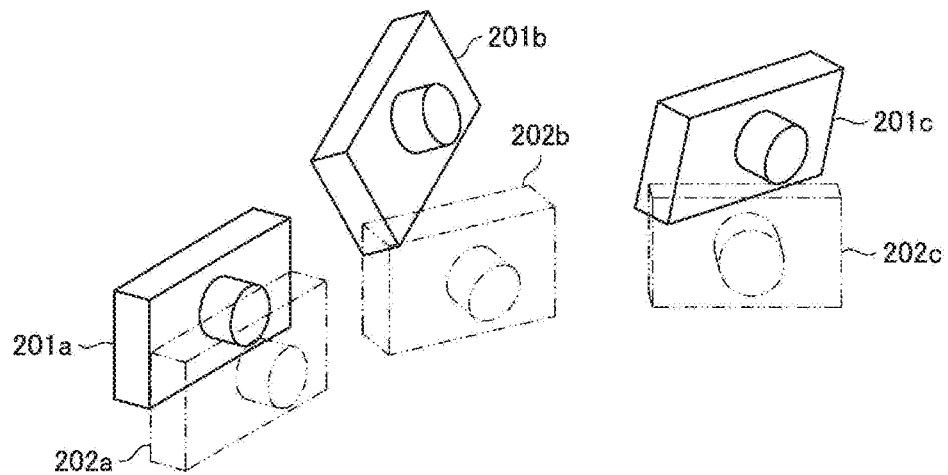
FIG. 5 is a diagram for describing a concept of current installation states and appropriate installation states of the imaging devices according to the first embodiment.

FIG. 5 is a diagram for describing a concept of current installation states and appropriate installation states of the imaging devices 200 according to the first embodiment. In the example illustrated in FIG. 5, the current installation states of the imaging devices 200 are indicated by images 201a to 201c representing the imaging devices. In addition, the appropriate installation states of the imaging devices 200 are indicated by images 202a to 202c representing the imaging devices. The imaging devices 201 indicating the current installation states and the imaging devices 202 indicating the appropriate installation states of the imaging devices 200 may be depicted using, for example, objects such as CG. In addition, the imaging devices 201 indicating the current installation states may be the imaging devices 200 that are in actual current installation states. The appropriate installation states of the imaging device 200 may deviate from the current installation states in terms of positions and attitudes as in the example of FIG. 5. In that case, it is not always easy to convey to a user specifically how positions and attitudes of the imaging devices 200 that are in the current installation states should be changed to realize the appropriate installation states. In addition, in reality, it is not necessary to completely match installation states of the imaging devices 200 with the appropriate installation states, and there are many cases in which images having satisfactory image quality are obtained if adjustment elements having high levels of priority (e.g., adjustment of a position through a parallel movement and adjustment of an attitude through rotation) are executed in parts. However, it is not easy for the user to understand such levels of priority of the adjustment elements. In addition, in the case in which the current installation states of the plurality of imaging devices 200 deviate from the appropriate installation states as in the illustrated example, it is not easy for the user either to understand from which imaging device 200 adjustment should start. Thus, the terminal device 100 according to the present embodiment presents the user with a specific adjustment instruction on the basis of a process indicated by the following steps.

(Calculation of amount of adjustment)

Referring to FIG. 4 again, the adjustment element calculation unit 121 calculates an amount of adjustment of each imaging device 200 with respect to each element using the current installation states and appropriate installation states of the plurality of imaging devices 200 (S102). Here, an adjustment element is a unit of adjustment from a current installation state to an appropriate installation state. An adjustment element can include, for example, a unit of adjustment with respect to a position or an attitude of one imaging device 200.

Figure 6:
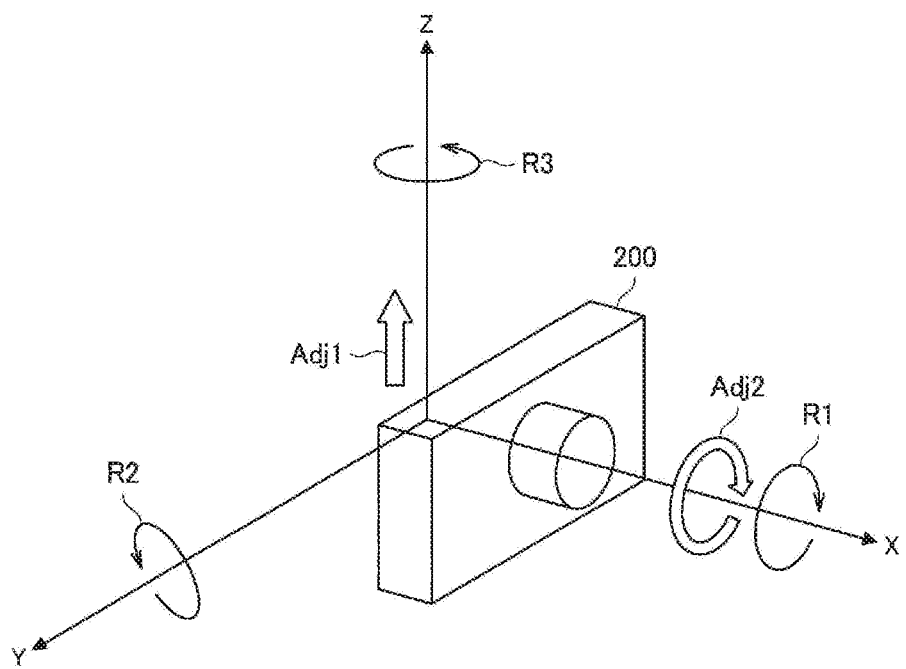
FIG. 6 is a diagram illustrating an example of elements to be adjusted of the imaging device stipulated in the first embodiment.

FIG. 6 is a diagram illustrating an example of adjustment elements of the imaging device stipulated in the first embodiment. In the illustrated example, the adjustment elements include parallel movements and rotation broken down into directions of coordinate axes in a spatial coordinate system. Parallel movement elements are, for example, elements of x axis, y axis, and z axis directions in the tri-axial coordinate system. In the illustrated example, the spatial coordinate system is defined with respect to the imaging device 200. That is, the x axis of the spatial coordinate system is set to coincide with an optical axis of the imaging device 200 and the y and z axes are set to be orthogonal to each other within a plane that is perpendicular to the optical axis of the imaging device 200. In the example illustrated in FIG. 6, for example, the adjustment elements include a parallel movement in the z axis direction of the imaging device 200 (indicated by an arrow Adj1). In addition, a rotation element is defined as, for example, rotation around each coordinate axis of the spatial coordinate system. In the illustrated example, rotation R1 around the x axis (roll), rotation R2 around the y axis (pitch), and rotation R3 around the z axis (yaw) are defined. In the example illustrated in FIG. 6, the adjustment elements include rotation around the x axis of the imaging device 200 (indicated by an arrow Adj2). As described above, the adjustment element calculation unit 121 can calculate an amount of adjustment of one imaging device included in the plurality of imaging devices 200 by breaking a parallel movement and rotation down into six elements. Note that, although the spatial coordinate system is defined with respect to each of a position and an attitude of the imaging device 200 in the present embodiment, a spatial coordinate system may be a common coordinate system for the plurality of imaging devices 200 in another embodiment. The common coordinate system may be, for example, a global coordinate system that uses an arbitrary point in a space as a reference point.

In the present embodiment, an amount of adjustment includes an amount of a change in coordinates or an angle of each adjustment element defined as described above. An amount of change in an adjustment element of a parallel movement is, for example, a movement distance calculated using coordinates of the imaging device 200 before and after adjustment. In a case in which a position of the imaging device 200 in a current installation state is, for example, the origin of the spatial coordinate system, a value obtained by breaking down coordinates of the imaging device 200 in an appropriate installation state with respect to each element in each coordinate axis direction is an amount of change in an adjustment element of a parallel movement corresponding to each coordinate axis. In addition, an amount of change in an adjustment element of rotation is a difference between rotation angles of the imaging device 200 around each coordinate axis before and after adjustment. In a case in which a rotation angle of the imaging device 200 in a current installation state around each coordinate axis is 0 degrees, for example, a rotation angle of the imaging device 200 in an appropriate installation state around each coordinate axis is an amount of change in the adjustment element of rotation with respect to each coordinate axis.

Such an amount of adjustment described above can be calculated using, for example, any of the two following methods. One is a method of calculating an amount of adjustment for shifting values, which are obtained by quantizing positions and attitudes of the plurality of imaging devices 200 in current installation states acquired using various sensors mounted therein, close to values of positions and attitudes thereof in appropriate installation states. The other one is a method in which a matrix which transforms images captured by the plurality of imaging devices 200 in current installation states into images captured thereby in appropriate installation states is obtained and an amount of adjustment is calculated on the basis of values included in the transformation matrix used at that time, such as a projective transformation matrix. Note that the transformation matrix can be calculated using various methods known in the field of image processing. In addition, an amount of adjustment may be calculated by combining the above-described two methods. For example, an approximate amount of adjustment may be calculated using the former method and then the amount of the adjustment may be corrected using the latter method.

Referring to FIG. 4 again, the adjustment element calculation unit 121 determines whether an amount of adjustment with respect to each of elements calculated in S102 is equal to or lower than a predetermined threshold value (S104). In a case in which the amounts of the adjustment with respect to all of the elements are equal to or lower than the predetermined threshold value (YES), the imaging device 200 can be regarded as being in a state sufficiently close to the appropriate installation state, and thus the adjustment element calculation unit 121 may skip a process of specifying an adjustment instruction thereafter. On the other hand, in a case in which at least some of the calculated amounts of the adjustment of the elements exceed the predetermined threshold value (NO), the adjustment element calculation unit 121 outputs the calculated amounts of the adjustment to the priority level determination unit 122 and the adjustment instruction specification unit 123 (S106 to S110). Note that the threshold value used in the determination of S104 may be arbitrarily set in accordance with performance of the imaging device 200, types of images that are captured by the plurality of imaging devices 200, or the like. In a case in which it is necessary to strictly adjust an installation position of the imaging device 200, for example, the threshold value may be set to a value close to 0, and when this is not the case, the threshold value may be set to a relatively high value. Note that the threshold value may be automatically set in accordance with performance of the imaging device 200 or the like or a setting relating to imaging, or by an operation of the user.

(Determination of Level of Priority)

Next the priority level determination unit 122 determines a level of priority on the basis of a parameter calculated for each of the elements with respect to the adjustment (S106). A level of priority refers to an index indicating which element should be adjusted by priority When the plurality of imaging devices 200 are shifted from the current installation states to the appropriate installation states. For example, in a case in which an amount of adjustment with respect to a movement of a certain imaging device 200 in the x axis direction is the highest when the adjustment is to be performed, the priority level determination unit may determine a highest level of priority for the element of a parallel movement in the x axis direction. In this case, the adjustment instruction specification unit 123, which will be described below, specifies an adjustment instruction for the user so that the element with a highest level of priority is executed, i.e., the instruction with respect to the adjustment for the movement in the x axis direction is executed by priority.

Here, a parameter for the priority level determination unit 122 to determine levels of priority in the present embodiment can include, for example, an amount of adjustment of each element. An amount of adjustment of each element is, for example, an amount of adjustment calculated by the adjustment element calculation unit 121, and specifically indicates an amount of movement in the x axis, the y axis, and the z axis directions, a rotation angle around the x axis, the y axis, and the z axis directions, or the like. The priority level determination unit 122 can determine levels of priority so that an element having a higher amount of adjustment is adjusted by priority. Accordingly, an element that is in a state most distant from the appropriate installation state can be designated to have a highest level of priority Note that the element of a parallel movement and the element of rotation have different units in an amount of adjustment. Thus, the priority level determination unit 122 may normalize or transform an amount of adjustment of each element. For example, the priority level determination unit 122 may transform an amount of adjustment into a value equivalent to the number of imaging pixels of the imaging device 200. Accordingly, levels of priority of the elements using different units can be compared.

In addition, the parameter for the priority level determination unit 122 to determine the levels of priority in the present embodiment can include, for example, a level of contribution of each element. A level of contribution of each element is a value indicating how much adjustment of an element executed when, for example, images captured by the plurality of imaging devices 200 are integrated contributes to improvement in image quality of an integrated image. Note that the above-described integrated image may be, for example, a composite image obtained by synthesizing a plurality of images captured by the plurality of imaging devices 200 using an image stitching process. That is, a level of contribution may be a value indicating how much an execution of adjustment of an element contributed to improvement in image quality of a composite image that is obtained through the image stitching process. In a case in which images captured by the plurality of imaging devices 200 are integrated, for example, if an installation state of each of the imaging devices 200 deviates from an appropriate installation state, it is necessary to perform a correction process on the images captured by the imaging devices 200 for the deviation. This correction process may cause the image quality of the integrated image to deteriorate. If a relationship between the correction process and an element (which can be an element such as a parallel movement or rotation, like an adjustment element) deviating from the appropriate installation state which caused the correction process is known, it is possible to calculate a degree of improvement in image quality in a case in which adjustment relating to an arbitrary adjustment element is executed and thus no correction process is necessary, i.e., a level of contribution of the adjustment element, by calculating the degree of deterioration in the image quality caused by the correction process.

Figure 7:
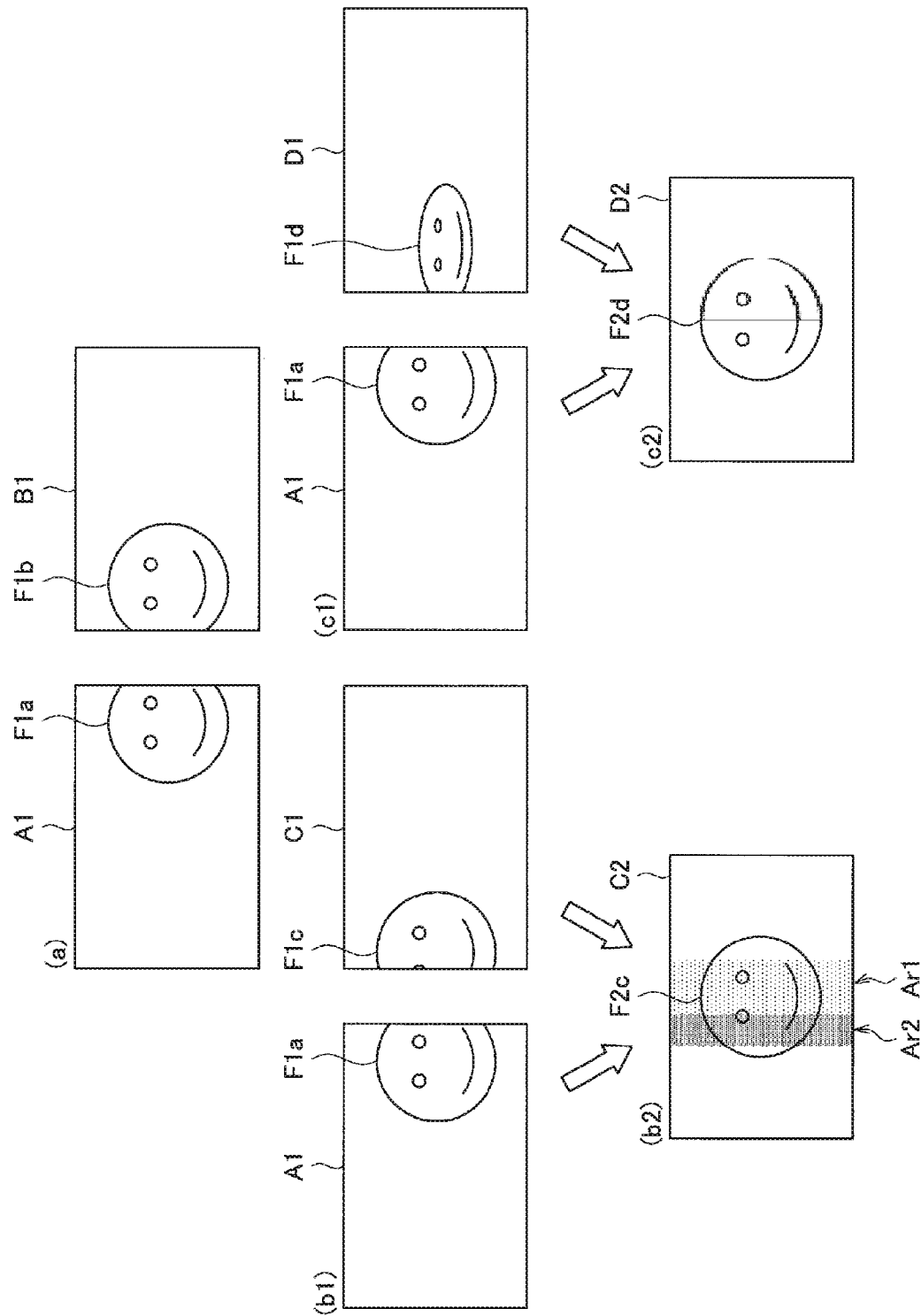
FIG. 7 shows diagrams illustrating an example of influence of correction on image quality of an integrated image in a case in which one element is not adjusted in the first embodiment.

FIG. 7 shows diagrams illustrating an example of influence of correction on image quality of an integrated image in a case in which one element is not adjusted in the first embodiment. FIG. 7 (a) is a diagram showing captured images A1 and B1 in a case in which the imaging device 200a and the imaging device 200b are all in the appropriate installation states. FIG. 7 (b1) is a diagram showing captured images A1 and C1 in a case in which the imaging device 200a is in the appropriate installation state and the imaging device 200b is in an installation state in which one element, which is a parallel movement, is not adjusted when adjustment to the appropriate installation state is performed. FIG. 7 (b2) is a diagram showing an integrated image C2 obtained by integrating the captured images A1 and C1 of FIG. 7 (b1). Meanwhile, FIG. 7 (c1) is a diagram showing captured images A1 and D1 in a case in which the imaging device 200a is in the appropriate installation state and the imaging device 200b in an installation state in which one element, which is rotation, is not adjusted when adjustment to the appropriate installation state is performed. FIG. 7 (c2) is a diagram showing an integrated image D2 obtained by integrating the captured images A1 and D1 of FIG. 7 (c1). Face images F1a to F1d are face images of a person F captured by the imaging devices 200a and 200b, and face images F2c and F2d are face images obtained by integrating the face images of the person F captured by the imaging devices 200a and 200b.

The imaging device 200b that captured the image C1 illustrated in FIG. 7 (b1) is in a state in which the imaging device is shifted from the appropriate installation state to the right toward the plane of paper to capture the person F. Thus, if the imaging device 200b makes a parallel movement to the left toward the plane of paper, an image like the captured image B1 can be obtained. Here, if the captured images A1 and C1 are integrated without adjusting the installation state of the imaging device 200b, the integrated image C2 illustrated in FIG. 7 (b2) is obtained. At that time, the face image F2c displayed in the integrated image C2 can be formed such that the faces of the person F displayed on the captured images A1 and C1 are integrated in an overlapping area Ar1. In a case in which the captured images A1 and B1 illustrated in FIG. 7 (a) are integrated, the face image displayed on the integrated image can be appropriately integrated in overlapping areas Ar1 and Ar2. That is, in a case in which one element, which is a parallel movement, is not adjusted, the number of overlapping areas of the two captured images decreases. If there is any overlapping area in that case, however, even if the captured image C1, which was captured in a non-appropriate installation state, is integrated, the integrated image does not have deteriorating image quality that may be caused by correction of the image, due to the integration. In such a case, the adjustment element that is a parallel movement can be said to have a low level of contribution.

On the other hand, the imaging device 200b that captured the captured image D1 illustrated in FIG. 7 (c1) is in a state in which one element that is rotation (e.g., a pitch) is not adjusted, and thus captures the person F in a mode in which the imaging device obliquely looks down the person F from above in the appropriate installation state. Then, the face image F1d displayed on the captured image D1 is a little distorted due to the imaging performed obliquely from above. Here, the distortion is, for example, trapezoidal distortion caused by a perspective of the captured image. If the captured images A1 and D1 are integrated without adjusting the installation state of the imaging device 200b in that case, the integrated image D2 illustrated in FIG. 7 (c2) is obtained. At this time, the distortion of the face image F1d displayed on the captured image D1 can be corrected. Then, image quality may deteriorate in the integrated portion of the captured image D1 in the face image F2d displayed on the integrated image D2 due to the correction of the distortion. Deterioration in image quality includes, for example, a decrease in resolution, blurring at an edge, and the like which are caused by expanding or contracting the face image F1d. Thus, in the case in which the captured images A1 and D1 are integrated, the image quality of the integrated image D2 can deteriorate due to correction of the distortion. In such a case, the adjustment element that is rotation can be said to have a high level of contribution.

The above-described level of contribution may be a predetermined value set for each adjustment element by, for example, practically simulating image correction with respect to the captured images received from the imaging devices 200. Alternatively, the level of contribution may be a value set in advance on the basis of a tendency of influence of the correction on the image quality which may occur in each adjustment element. For example, the level of contribution may be a value obtained by multiplying a weight set in advance for each element by the above-described amount of adjustment of the element. In this case, the adjustment element of rotation tends to have more significant influence on (contribution to) the image quality of the integrated image than the adjustment element of a parallel movement as described above. For that reason, a weight of the adjustment element of rotation may be set to be higher than a weight of the adjustment element of a parallel movement. Note that weights may be different depending on a subject of the imaging devices 200, an installation formation of the imaging devices 200, and the like. In a case in which a subject is very close to the imaging devices 200, for example, there is a case in which the element of a parallel movement has significant influence on (or significantly contributes to) image quality of an integrated image and the element of rotation has little influence thereon. In addition, different weights may be set in accordance with performance and a setting for imaging of the imaging devices 200.

In addition, the above-described level of contribution may be calculated by the priority level determination unit 122 using a degree of deterioration in image quality of images corrected to be integrated, Which are captured by the plurality of imaging devices 200 that are in the current installation states. For example, the priority level determination unit 122 may actually integrate images captured by the plurality of imaging devices 200 that are in the current installation states, evaluate a degree of deterioration in the image quality of the captured images caused by correction for integration with respect to each element, and thereby calculate the level of contribution of each element. In addition, the priority level determination unit 122 may calculate a transformation matrix to be used when the images captured by the plurality of imaging devices 200 that are in the current installation states are corrected for integration and calculate the level of contribution of each element on the basis of values included in the transformation matrix. In addition, the priority level determination unit 122 may calculate the level of contribution of each element by evaluating a difference in the image quality of two captured images made when one of the captured images is integrated with the other one with respect to each element. As described above, the priority level determination unit 122 can calculate the level of contribution on the basis of the images captured by the plurality of imaging devices 200 in the current installation states.

(Specification of adjustment instruction)

Referring to FIG. 4 again, the adjustment instruction specification unit 123 specifies an instruction regarding adjustment in accordance with the level of priority of each adjustment element, following the determination of the level of priority of S106 (S108). More specifically, the adjustment instruction specification unit 123 specifies the instruction regarding adjustment by extracting or arranging an element. Here, the instruction regarding adjustment is, for example, information including an adjustment procedure or an adjustment method for a user to shift the imaging devices 200 close to the appropriate installation states. The user can perform adjustments of the imaging devices 200 accurately and efficiently by specifying an instruction for the adjustments in accordance with the levels of priority calculated by the priority level determination unit 122. Note that the levels of priority used here may be the levels of priority calculated by the priority level determination unit 122, or pre-set levels of priority may be used.

In a case in which adjustment is performed to shift the imaging devices 200 close to the appropriate installation states, one of an amount of adjustment or a level of contribution of each element having a greatest value to be used as a parameter for determining the level of priority of the element can be adjusted, and thereby images captured by the imaging devices 200 can be shifted close to images captured in the appropriate installation states with the highest efficiency. For this reason, the adjustment instruction specification unit 123 may specify an instruction by extracting an element among the adjustment elements having a highest level of priority. For example, the adjustment instruction specification unit 123 may select only a data item of the element having the highest level of priority as an adjustment instruction from a predetermined number of data items of the adjustment elements. Accordingly, the imaging devices 200 can be shifted close to the appropriate installation states with efficiency. In addition, the adjustment instruction specification unit 123 may select lesser types of data items of the adjustment elements than the predetermined number of data items of the adjustment elements therefrom as adjustment instructions in accordance with the levels of priority.

Accordingly, the imaging devices 200 can be shifted close to the appropriate installation states with higher efficiency.

Further, in a case in which adjustment is performed to shift the imaging devices 200 close to the appropriate installation states, the imaging devices 200 can he shifted close to the appropriate installation states with higher efficiency by adjusting the elements in order of amounts of adjustment or levels of contribution from highest to lowest. Thus, the adjustment instruction specification unit 123 may specify an instruction by arranging the adjustment elements in order of levels of priority from highest to lowest. For example, the adjustment instruction specification unit 123 may perform a process of prioritizing the predetermined number of data items of the adjustment elements in order of levels of priority from highest to lowest. In addition, the adjustment instruction specification unit 123 may perform a process of storing the predetermined number of data items of the adjustment elements in order of levels of priority from highest to lowest as a data arrangement. Note that, the adjustment instruction specification unit 123 may perform only one of the extraction process and the arrangement process, or perform the extraction process and the arrangement process in a combining manner. In the case in which the combination process of the extraction process and the arrangement process is performed, for example, the adjustment instruction specification unit 123 may perform a process of prioritizing the predetermined number of data items of the adjustment elements in order of levels of priority from highest to lowest and a process of selecting a plurality of data items of the adjustment elements ranked at a predetermined level of priority or higher among the items as adjustment instructions. Accordingly, the imaging devices 200 can be shifted close to the appropriate installation states with higher efficiency.

Further, in a case in which adjustment is performed to shift the plurality of imaging devices 200 close to the appropriate installation states, the imaging devices 200 can be shifted to the appropriate installation states more exactly by specifically indicating how much the current installation states of the imaging devices 200 are distant from the appropriate installation states. That is, by perform adjustment beginning from an imaging device 200 whose current installation state is greatly distant from the appropriate installation state by priority, an installation state close to the appropriate installation state can be realized in an earlier stage. Thus, the adjustment instruction specification unit 123 may specify an instruction by extracting adjustment in a position or an attitude of at least one imaging device among adjustment elements including adjustments in positions or attitudes of the plurality of imaging devices 200. In this case, the adjustment instruction specification unit 123 may specify the instruction by further extracting or arranging at least one element from the elements such as a parallel movement or rotation in accordance with the levels of priority for the adjustment of the at least one imaging device.

Further, in the case in which the adjustment is performed to shift the plurality of imaging devices 200 close to the appropriate installation states, it is necessary to perform the adjustment beginning from an imaging device including an adjustment element having a larger amount of adjustment or a higher level of contribution in order to avoid deterioration in image quality of an integrated image obtained from the plurality of imaging devices 200. Thus, the adjustment instruction specification unit 123 may specify the instruction by extracting the adjustment of a position or an attitude of at least one imaging device including an element with a high level of priority among the plurality of imaging devices 200.

As described above, the adjustment instruction specification unit 123 can specify the instruction regarding the adjustment in accordance with the levels of priority that are predetermined or determined by the priority level determination unit 122 using the various methods.

(Output control)

Next, the output control unit 124 performs control of output of the instruction specified by the adjustment instruction specification unit 123 in accordance with the levels of priority (S110). For example, the output control unit 124 performs control of expressing the instruction in a specific form in accordance with the levels of priority and presenting the instruction to the user. The specific form may be, for example, an image or a sound.

The instruction specified h the adjustment instruction specification unit 123 is output by the output control unit 124 via the output unit 150, for example, in a specific form such as a display or a sound. The instruction specified by the adjustment instruction specification unit 123 may be, for example, controlled such that it is output by the output control unit 124 as information indicating a specific form, transmitted to an external device via the communication unit 110, and output via an output device of the external device. Specifically, the display or the sound indicating the instruction may be transmitted to the plurality of imaging devices 200 via the communication unit 110. In this case, the display or the sound relating to the instruction is presented to the user via the output devices of the imaging devices 200 at the time of adjustment of the imaging devices 200, and thus the imaging devices 200 can be adjusted more easily. Note that specific examples of the output of the instruction by the output control unit 124 will be described below.

The adjustment instruction which enables the user to adjust the imaging devices 200 accurately and efficiently can be presented to the user through the above-described process, (Process flow of adjustment of installation state of plurality of imaging devices)

Figure 8:
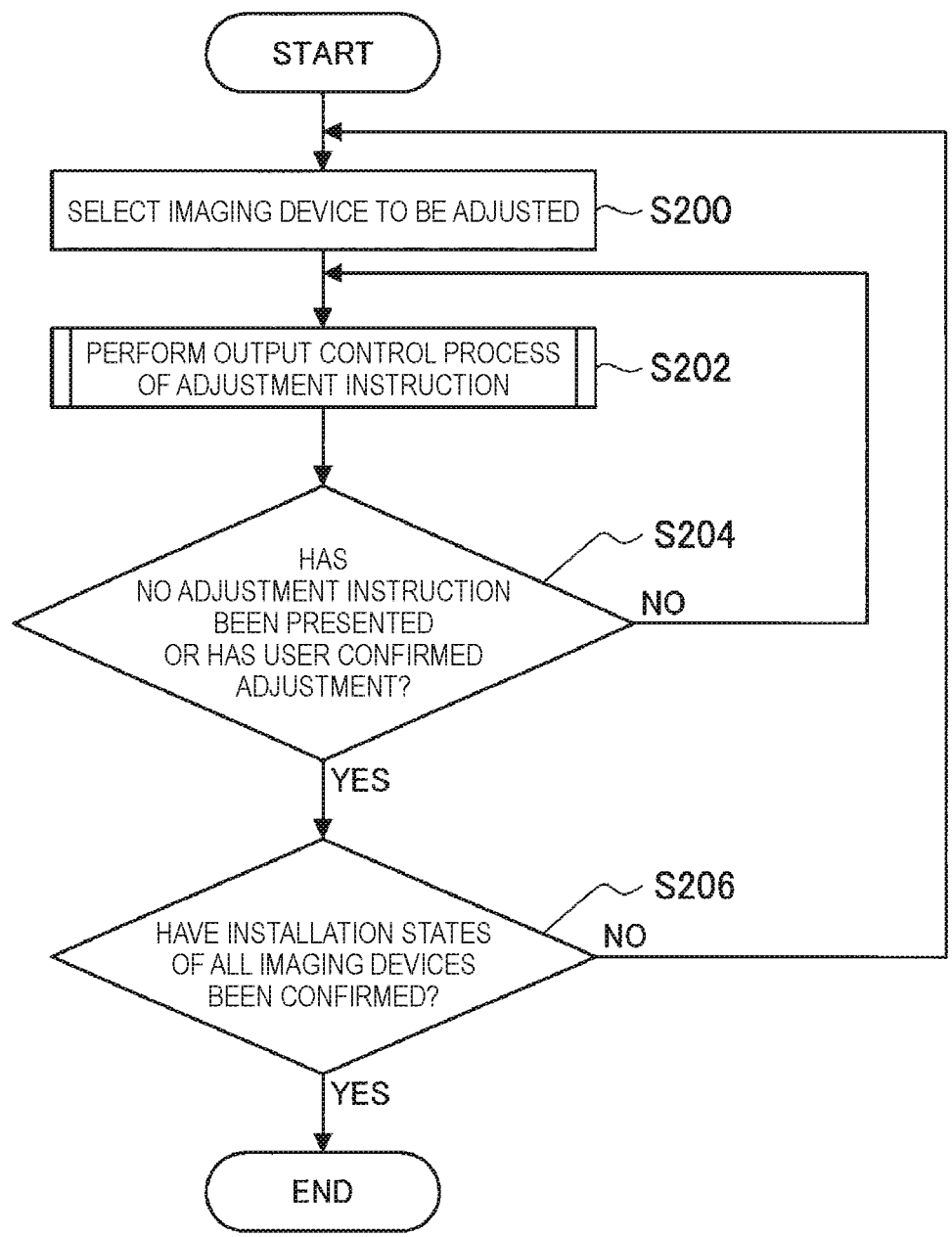
FIG. 8 is a flowchart showing a process flow of adjustment of installation states of a plurality of imaging devices in the first embodiment.

Next, a process flow of the terminal device 100 in a case in which a user adjusts installation states of the plurality of imaging devices 200 will be described. FIG. 8 is a flowchart showing the process flow of adjustment of the installation states of the plurality of imaging devices 200 in the first embodiment. Referring to FIG. 8, first, the terminal device 100 selects an imaging device 200 to be adjusted (S200). Here, the terminal device 100 may select an imaging device 200 to be adjusted in accordance with input of the user. In addition, the terminal device 100 may determine the level of priority of each element with respect to the plurality of imaging devices 200 and select the imaging device 200 to be adjusted on the basis of the determined in levels of priority in S200. For example, the terminal device 100 may select an imaging device 200 including an element having the highest level of priority as an imaging device to be adjusted. Accordingly, the user can perform adjustment from the imaging device 200 to be adjusted with the highest priority.

When the imaging device 200 is selected, an output control process with respect to an instruction for the adjustment of the imaging device 200 is executed (S202). The process executed in Step S202 is the process described using the flowchart of FIG. 4. Through the process, an adjustment instruction is presented in a case in which at least some of amounts of adjustments of the adjustment elements of the imaging device 200 are not equal to or lower than a predetermined threshold value. On the other hand, in a case in which all of the amounts of adjustment of the adjustment elements of the imaging device 200 are likely to be equal to or lower than the predetermined threshold value, the process of specifying the adjustment instruction is not performed, and thus no adjustment instruction is presented.

Next, the terminal device 100 determines whether the adjustment instruction has not been presented or whether the adjustment of the imaging device 200 has been confirmed through input of the user even through the adjustment instruction was presented (S204). In the illustrated example, the user can confirm the adjustment of the adjustment element presented with the adjustment instruction through input via the input unit 140 in a case in which execution of the adjustment of the imaging device 200 is determined not to be necessary even in a case in which the terminal device 100 presents the adjustment instruction. In a case in which the adjustment instruction is presented but the user does not confirm the adjustment (NO), the terminal device 100 executes the output control process with respect to the adjustment instruction of the imaging device 200 (S202) again while the user continuously performs the adjustment of the imaging device 200. In this case, the levels of priority of the adjustment elements may be determined again, having the adjusted installation states as current installation states.

On the other hand, in a case in which no adjustment instruction has been presented or an adjustment instruction has been presented but the adjustment of the imaging device 200 has been confirmed through input of the user in S204 (YES), it is determined whether all of the installation states of the other imaging devices 200 have been confirmed (S206). In a case in which all of the installation states of the other imaging devices 200 have not been confirmed (NO), the process returns to the process of selecting another imaging device 200 to be adjusted (S200). On the other hand, in a case in which all of the installation states of the other imaging devices 200 have been confirmed in S206 (YES), the process for the adjustment of the installation states of the plurality of imaging devices 200 ends.

Through the above-described process, the user can sequentially execute the adjustment of the plurality of imaging devices 200 in accordance with the adjustment instruction of the terminal device 100.

[1-3. Examples of Output]

Next, examples of output of an instruction specified by the adjustment instruction specification unit 123 will be described with reference to FIGS. 9 to 17. Note that a display showing the instruction can be presented via the display realizing the function of the output unit 150 of the terminal device 100 in FIGS. 9 to 15, via the display realizing the function of the output unit 250 of the imaging device 200 in FIG. 16, and via the LED 251 of the imaging device 200 in FIG. 17. Note that the instruction specified by the adjustment instruction specification unit 123 may be transmitted to an external device and output via an output device of the external device.

(Example in which instruction is displayed in order of levels of priority from highest to lowest)

Figure 9A:
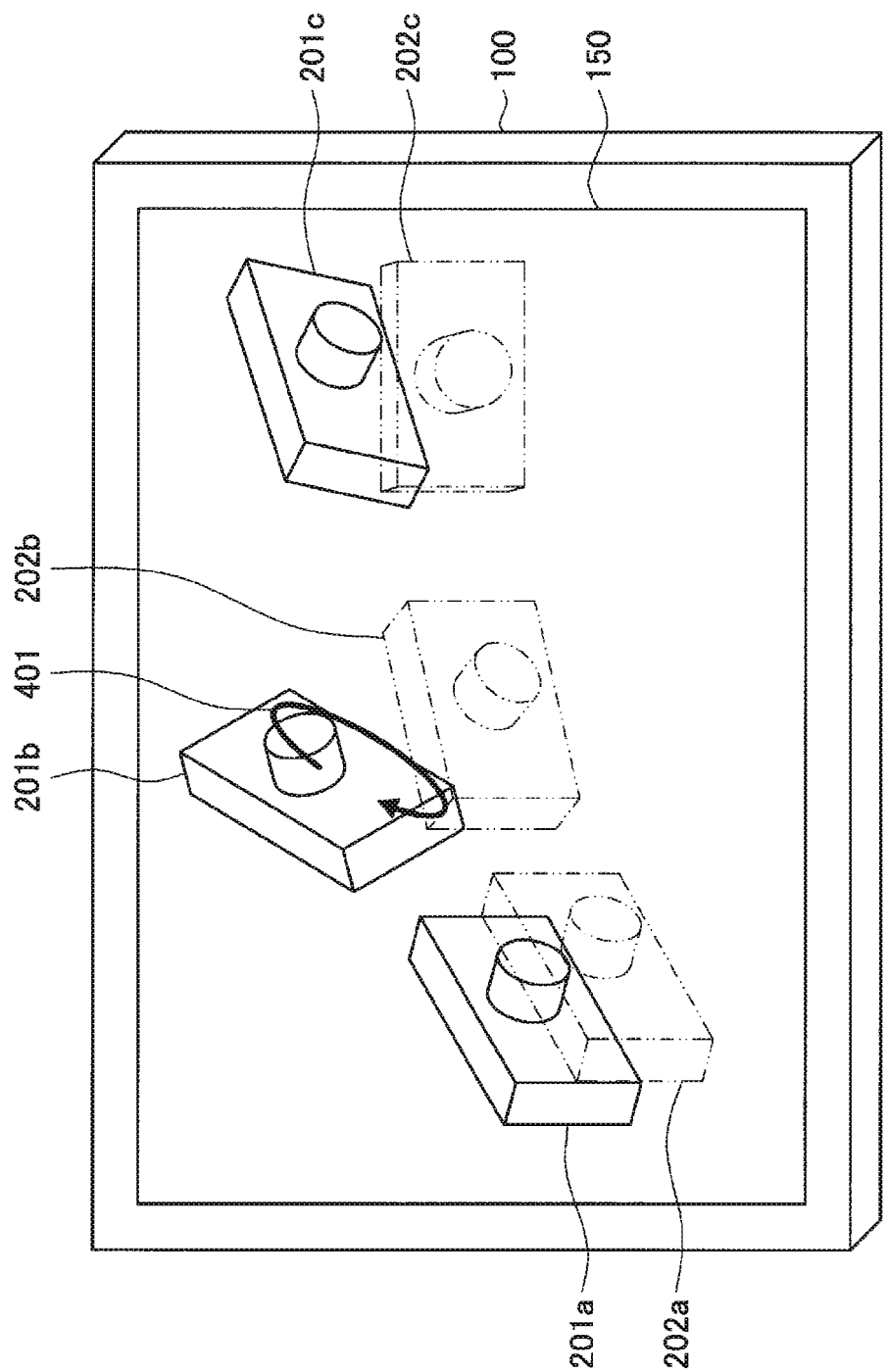
FIG. 9A is a diagram illustrating an example in which adjustment instructions are displayed in order of levels of priority from highest to lowest in the first embodiment.

FIGS. 9A to 9C are diagrams showing examples in which adjustment instructions are displayed in order of levels of priority from highest to lowest in the first embodiment. Referring to FIG. 9A, the images 201a to 201c representing current installation states of the imaging devices 200a to 200c captured by the terminal device 100, the images 202a to 202c representing appropriate installation states thereof, and an arrow 401 representing an adjustment instruction regarding the imaging device 200b are depicted. The arrow 401 is an arrow displaying the instruction indicating an adjustment method for the imaging device 200b that is in the current installation state. In a case in which a linear arrow is displayed, for example, the user can recognize that the imaging device 200 should make a parallel movement in the direction indicated by the arrow. In addition, in a case in which an arc-shaped arrow is displayed, the user can recognize that the imaging device 200 should make rotation in the direction indicated by the arrow. In the illustrated example, the imaging device 200b is selected as an imaging device to be adjusted. In addition, the terminal device 100 causes the arrow 401 to be displayed as a result of the process performed to specify the adjustment instruction of the imaging device 200b. The arrow 401 represents rotation around the z axis (yaw). The reason for this is that the rotation around the z axis has the highest level of priority with respect to adjustment elements of the imaging device 200b determined by the priority level determination unit 122 of the terminal device 100. Thus, the user can ascertain that the imaging device 200b should be rotated in the direction of the arrow 401.

After the user adjusts the imaging device 200b in accordance with the instruction indicated by the arrow 401 and the adjustment is confirmed, the terminal device 100 may present an instruction regarding an element having the second highest level of priority. Referring to FIG. 9B, the terminal device 100 causes an arrow 402 to be displayed as a result of a process performed to specify an adjustment instruction of the imaging device 200b again. The arrow 402 represents rotation around the x axis (roll). The reason for this is that a roll element has the highest level of priority among adjustment elements in the installation state of the imaging device 200b after the yaw element is adjusted. Thus, the user can ascertain that the imaging device 200b should be rotated in the direction of the arrow 402.

After the user adjusts the imaging device 200b in accordance with the instruction indicated by the arrow 402 and the adjustment is confirmed, the terminal device 100 may present an instruction regarding an element having the third highest level of priority likewise. Referring to FIG. 9C, the terminal device 100 causes the arrow 403 indicating rotation in the x axis direction to be displayed. The user can ascertain that the imaging device 200h should he moved in the direction of the arrow 403. By displaying the adjustment elements having the high levels of priority as described above, the user can easily shift the imaging device 200 close to the appropriate installation states. The terminal device 100 may also display the arrows indicating the instructions for adjusting the elements having the high levels of priority in order as described above. Note that the number of times in which arrows indicating adjustment instructions are presented can be freely set. The terminal device 100 may display, for example, only an arrow indicating an instruction for adjusting an element having the highest level of priority or present arrows with respect to all elements in order of the levels of priority from highest to lowest.

(Example in which plurality of instructions are displayed all at once)

Figure 10:
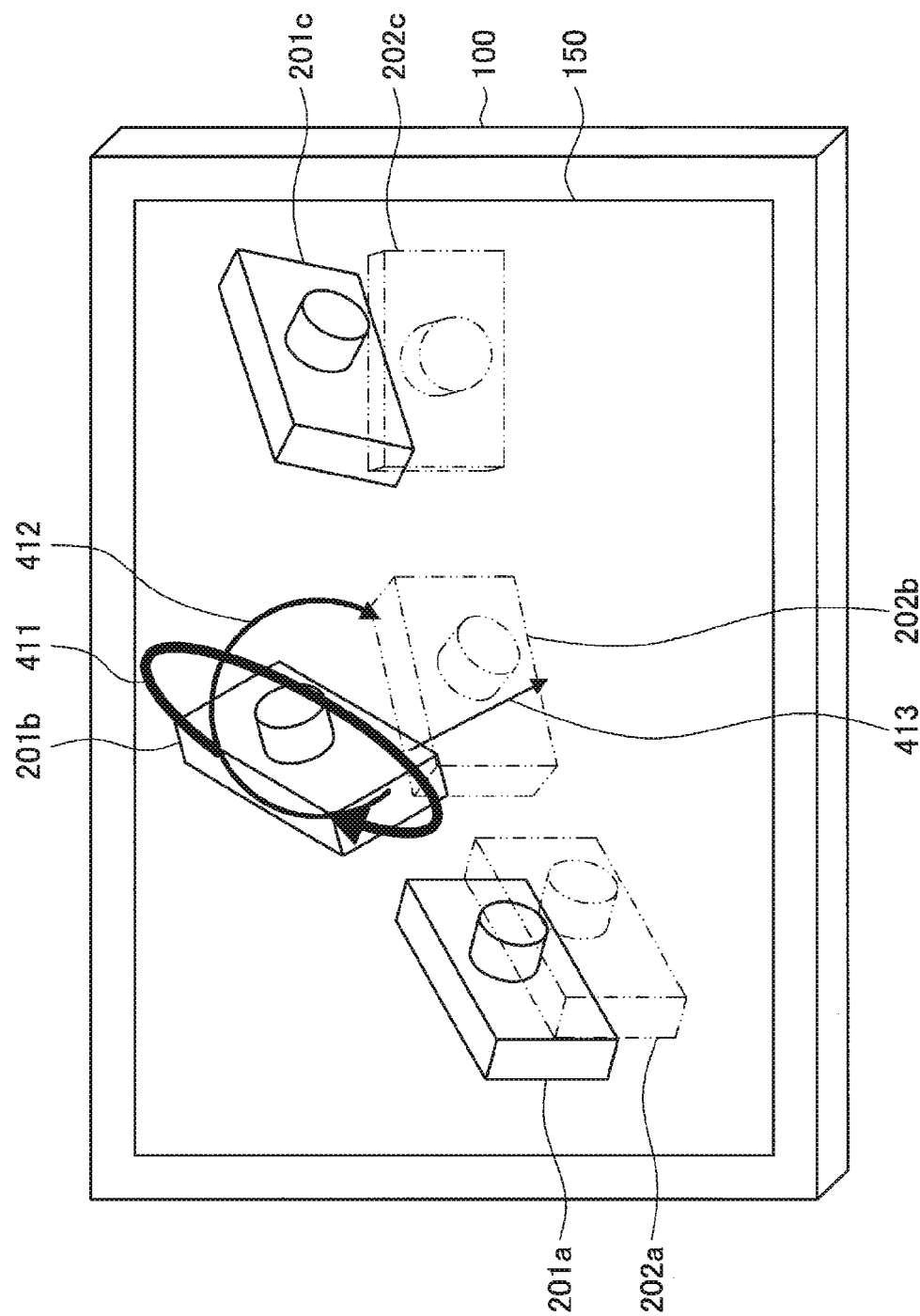
FIG. 10 is a diagram illustrating an example in which a plurality of adjustment instructions for one imaging device are displayed all at once in the first embodiment.

FIG. 10 is a diagram illustrating an example in which a plurality of adjustment instructions for the imaging device 200 are displayed all at once in the first embodiment. Referring to FIG. 10, the images 201a to 201c representing the current installation states of the imaging devices 200a to 200c and the images 202a to 202c representing the appropriate installation states as well as arrows 411 to 413 representing adjustment instructions for the imaging device 200b are depicted. In this case, for example, thicknesses of the arrows 411 to 413 may be different in accordance with levels of priority in order to help the user recognize the levels of priority. Specifically, the arrow indicating an instruction for adjusting an element having a highest level of priority may be set to be thickest and the other arrows indicating may be set to be thinner as the levels of priority decreases. Since the arrow 411 is thickest in the example illustrated in FIG. 10, the rotation in the direction indicted by the arrow 411 (yaw) can be recognized as an adjustment element with the highest level of priority. Since the arrow 412 is the second thickest to the arrow 411, it can be recognized as indicating an adjustment element with the next highest level of priority (roll). Since the arrow 413 is thinnest, it can be recognized as indicating an adjustment element with the lowest level of priority (movement in the x axis direction). As described above, the terminal device 100 may display the plurality of arrows all at once. At that time, shapes of the arrows may also be changed in accordance with the levels of priority. Although the terminal device 100 has the thicknesses of the arrows changed in accordance with the levels of priority in this example, the terminal device 100 may have, for example, colors of the arrows changed or cause a dynamic form such as flicker or rotation of the arrow indicating the highest level of priority to be displayed to draw attention of the user. Accordingly, the user can intuitively ascertain an element to be adjusted.

(Example in which instructions for plurality of imaging D are displayed all at once)

Figure 11:
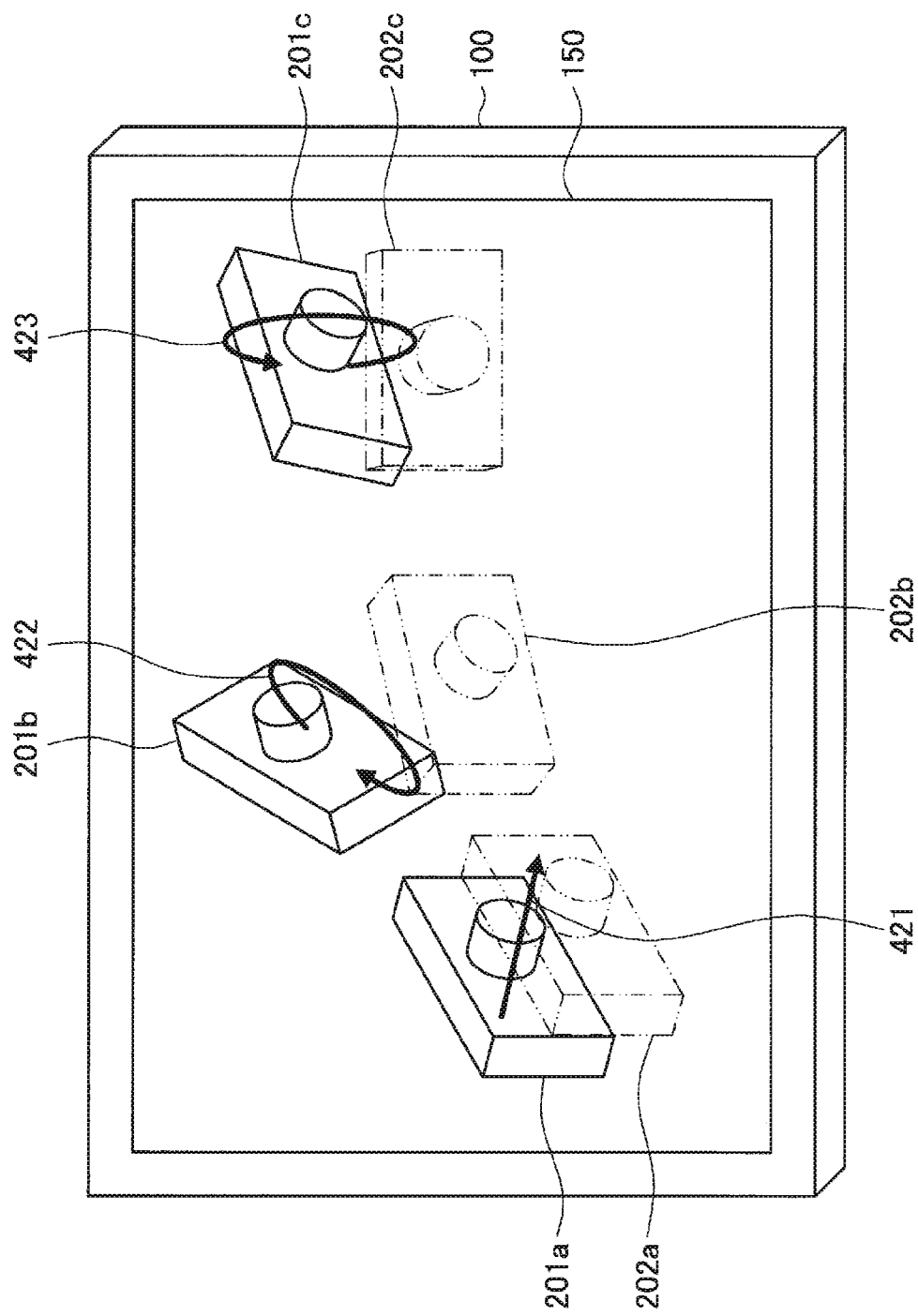
FIG. 11 is a diagram illustrating an example in which adjustment instructions for the plurality of imaging devices are displayed all at once in the first embodiment.

FIG. 11 is a diagram illustrating an example in which adjustment instructions for the plurality of imaging devices 200 are displayed all at once in the first embodiment. Referring to FIG. 11, the images 201a to 201c representing the current installation states of the imaging devices 200a to 200c and the images 202a to 202c representing the appropriate installation states as well as arrows 421 to 423 representing adjustment instructions for the imaging devices 200a to 200c are depicted. The arrows 421 to 423 may be arrows indicating instructions for adjusting elements with highest levels of priority among adjustment elements of each of the imaging devices 200a to 200c. In addition, in a case in which adjustment relating to an arrow with respect to each imaging device among the arrows 421 to 423 has been completed on any of the imaging devices 200a to 200c, the terminal device 100 may cause another arrow indicating an instruction for adjusting an element with a second highest level of priority to he displayed. In this way, the terminal device 100 may cause the arrows with respect to the plurality of imaging devices to be displayed all at once. Accordingly, the user can adjust a close imaging device first among the imaging devices 200a to 200c. In addition, the user can also save an effort to select an imaging device 200 to be adjusted. In that case, the process of selecting the imaging device 200 in 52.00 may not be executed in the process flow shown in FIG. 8.

(Example in which instructions are displayed using coordinate axes)

Figure 12:
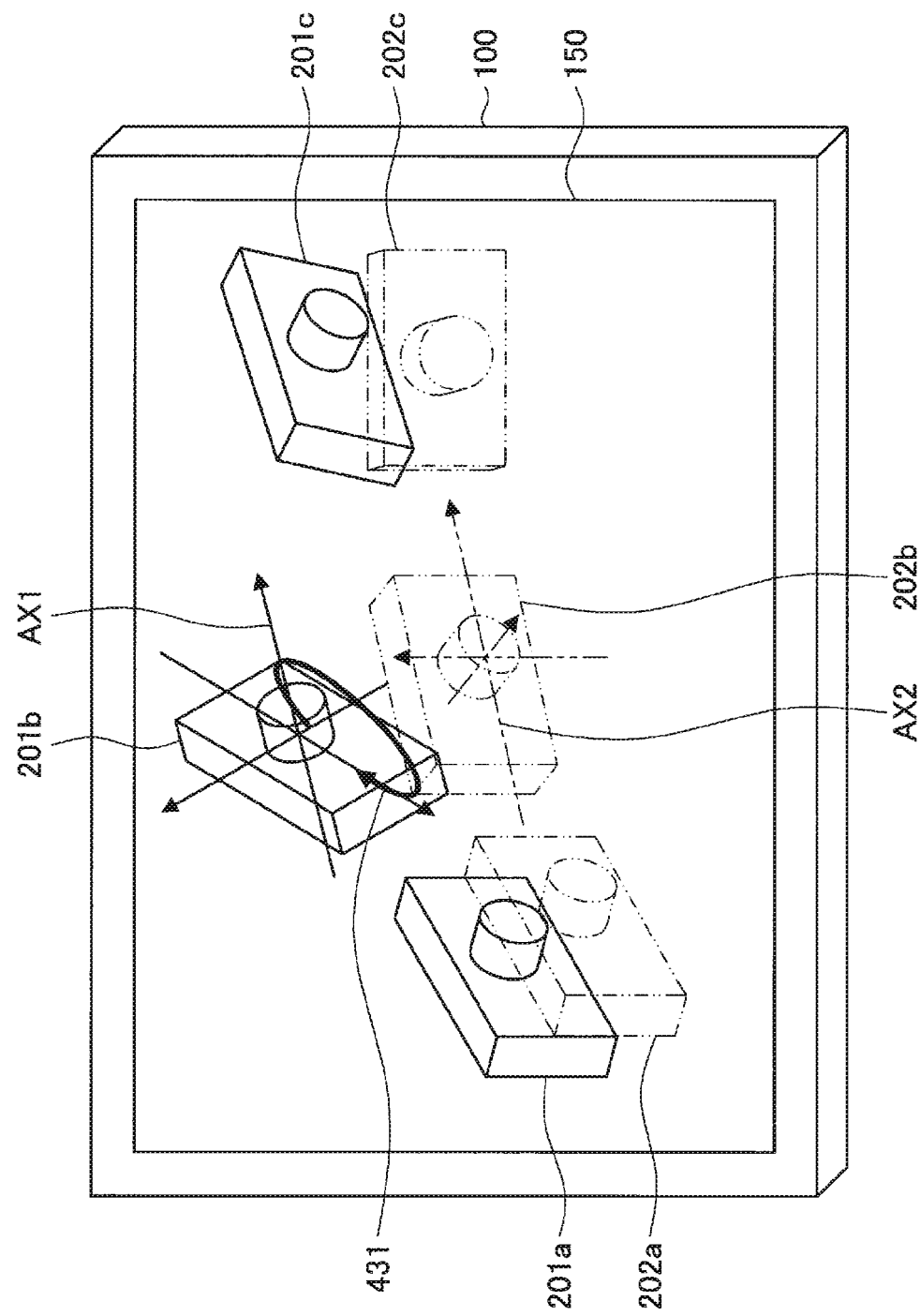
FIG. 12 is a diagram illustrating an example in which adjustment instructions are displayed along with coordinate axes of the imaging devices in the first embodiment.

FIG. 12 is a diagram illustrating an example in which adjustment instructions are displayed along with coordinate axes of the imaging devices 200 in the first embodiment. Referring to FIG. 12, the images 201a to 201c representing the current installation states of the imaging devices 200a to 200c, the images 202a to 202c representing the appropriate installation states, and an arrow 431 representing an adjustment instruction for the imaging devices 200b, as well as a coordinate axis AX1 of the imaging device 200b in the current installation state and a coordinate axis AX2 of the imaging device 200b in the appropriate installation state are depicted. The coordinate axis AX1 may move and rotate in accordance with adjustments of the imaging device 200b. Accordingly, when the user adjusts the imaging device 200b, the imaging device can be shifted close to the appropriate installation state with reference to the coordinate axis. Note that, in a case in which adjustment relating to the arrow 431 has been completed on the imaging device 200b, the terminal device 100 may cause an arrow indicating an instruction for adjusting an element with a second highest level of priority to be displayed.

(Example in which levels of priority are digitized and displayed)

Figure 13:
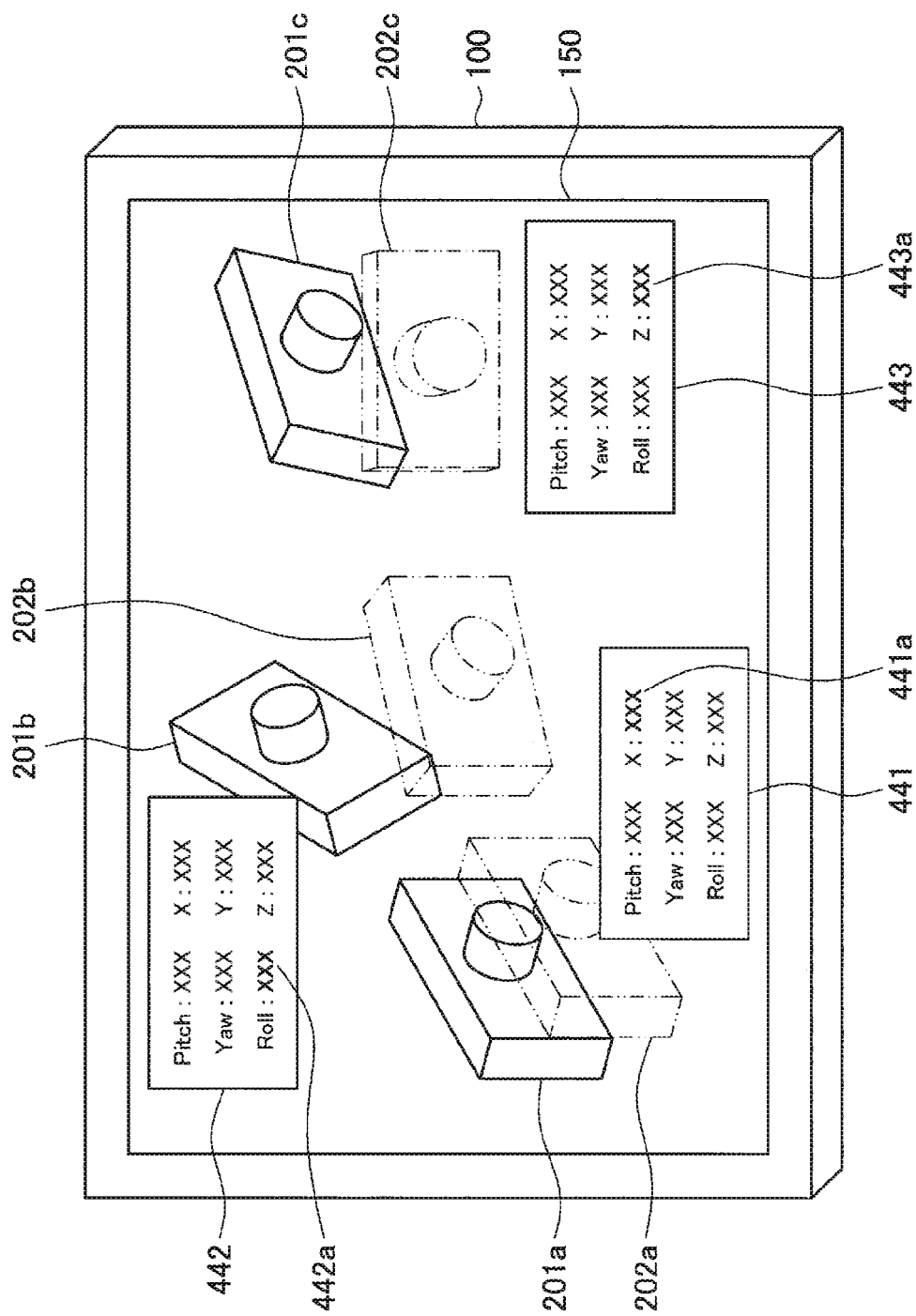
FIG. 13 is a diagram illustrating an example in which levels of priority are digitized and displayed in the first embodiment.

FIG. 13 is a diagram illustrating an example in which levels of priority are digitized and displayed in the embodiment. Referring to FIG. 13, the images 201a to 201c representing the current installation states of the imaging devices 200a to 200c and the images 202a to 202c representing the appropriate installation states as well as frames 441 to 443 in which digitized values of levels of priority with respect to parallel movements (in the x axis, y axis, and z axis directions) and rotations (pitch, roll, and yaw) that are adjustment elements of the imaging devices 200 are included are depicted. Numerical values described in the frames 441 to 443 may be appropriately modified in accordance with adjustments of the imaging devices 200a to 200c, The digitized levels of priority may be, for example, amounts of adjustment of elements of the imaging devices 200 or levels of contribution. In addition, the terminal device 100 may cause a form in which a numerical value of an element indicating a highest level of priority has a changed text size to be displayed to draw attention of the user. Accordingly, the user can ascertain an element to be adjusted quantitatively.

(Example in which levels of priority are displayed using indicators)

Figure 14:
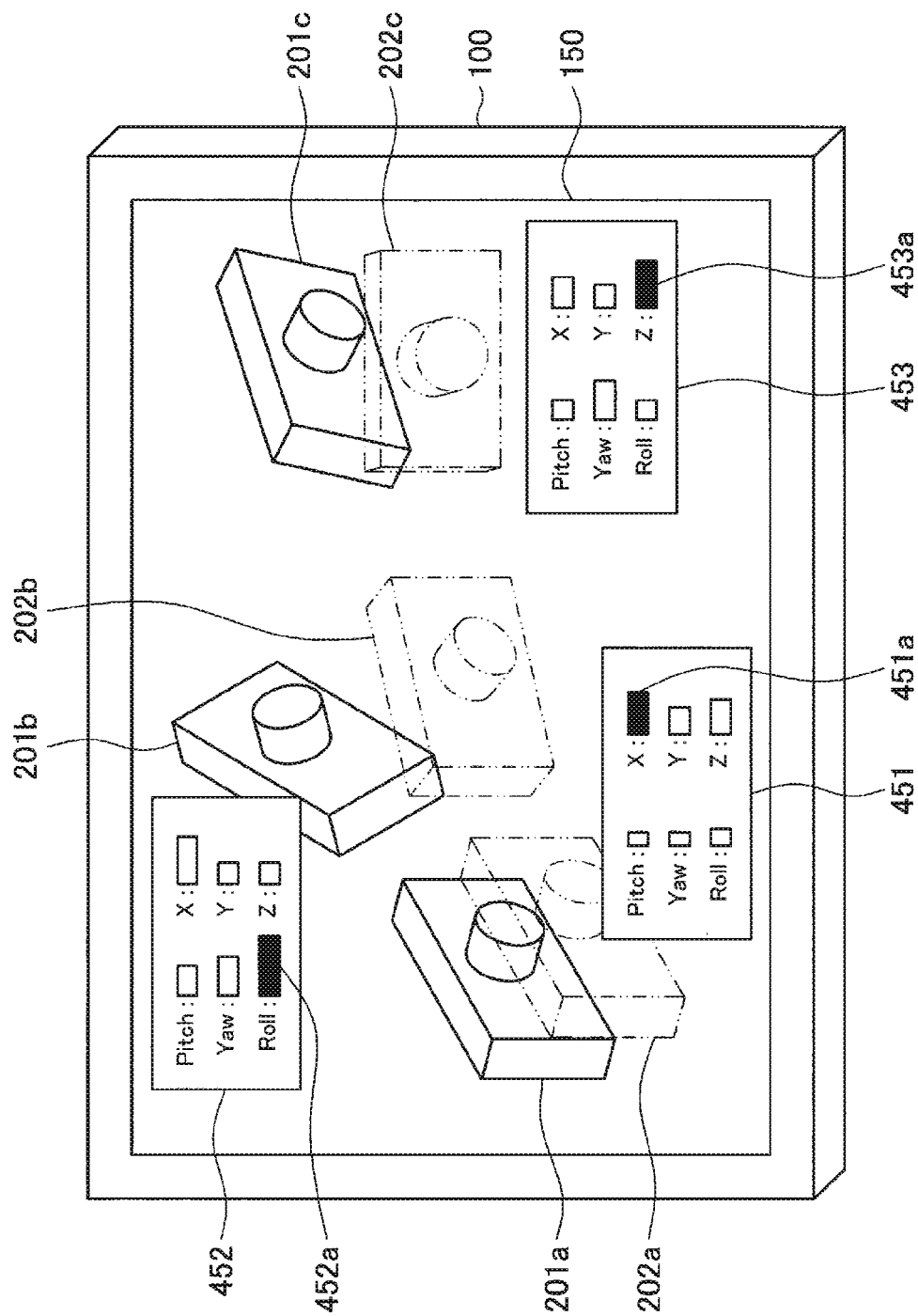
FIG. 14 is a diagram illustrating an example in which levels of priority are displayed using indicators in the embodiment.

FIG. 14 is a diagram illustrating an example in which levels of priority are displayed using indicators in the first embodiment. Referring to FIG. 14, the images 201a to 201c representing the current installation states of the imaging devices 200a to 200c and the images 202a to 202c representing the appropriate installation states as well as frames 451 to 453 in which indicators such as bars displaying levels of priority of parallel movement and rotation elements that are adjustment elements of the imaging devices 200 are displayed are depicted. Each of the indicators included in the frames 451 to 453 may be appropriately modified in accordance with adjustments of the imaging devices 200a to 200c. The levels of priority indicated by the indicators may be, for example, amounts of adjustment of elements of the imaging devices 200 or levels of contribution. In addition, an indicator for an element indicating a highest level of priority may be displayed in a form in which color of a bar is changed to draw attention of the user. Further, a form of an indicator is not limited to bar as illustrated in FIG. 14, and may be, for example, a polygonal line or a circle. Accordingly, the user can intuitively ascertain an element to be adjusted.

(Example in which levels of priority are displayed to be superimposed on images of imaging devices)

Figure 15:
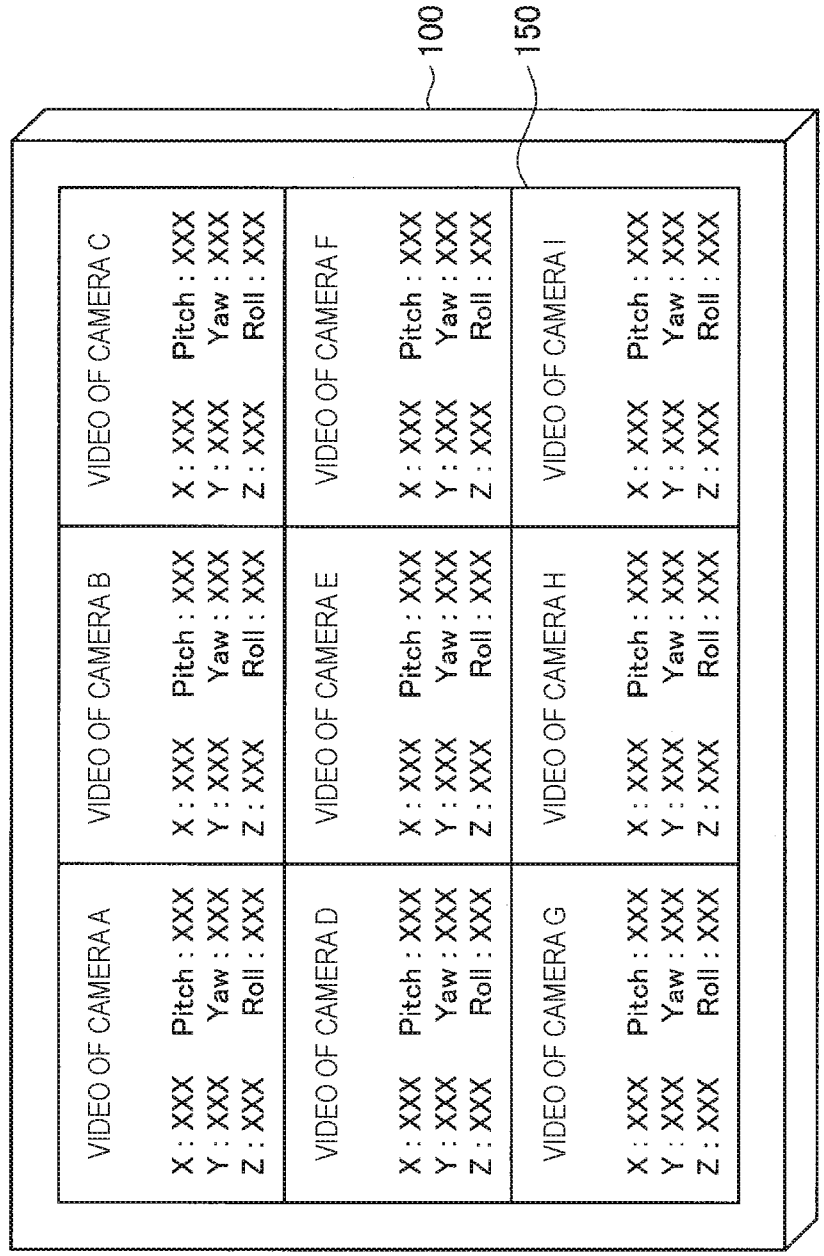
FIG. 15 is a diagram illustrating an example in which levels of priority of adjustment elements of the plurality of imaging devices are displayed to be superimposed on images captured by the imaging devices in the first embodiment.

FIG. 15 is a diagram illustrating an example in which levels of priority of adjustment elements of the imaging devices 200 are displayed to be superimposed on images captured by the imaging devices in the first embodiment. Referring to FIG. 15, images captured by the plurality of imaging devices 200 are each disposed in 3×3 frames, and numerical values of levels of priority of adjustment elements of the imaging devices are shown. Note that the numerical values indicating the levels of priority may be replaced with the indicators illustrated in the example of FIG. 14. In addition, the numerical values described in each frame may be appropriately modified in accordance with adjustment of an installation state of each imaging device. Further, a numerical value of an element indicating a highest level of priority may be displayed in a form in which a text size is changed to draw attention of the user as illustrated in FIG. 13. Accordingly, the user can adjust the installation state of each imaging device in accordance with the numerical value of a level of priority displaying the imaging device while checking the image captured by the imaging device.

(Example in which instruction is output along with output screen of captured image)

Next, an example in which information with regard to an adjustment instruction specified by the adjustment instruction specification unit 123 is transmitted by the communication unit 110 to an imaging device 200 and output along with an output screen of the imaging device 200 will be described as a modified example of the present embodiment. FIGS. 16A and 16B are diagrams illustrating the modified example in which an instruction is displayed on an Output screen of a live view image captured by the imaging device 200 in the first embodiment. Referring to FIG. 16A, an arrow 461a indicating an adjustment instruction regarding the imaging device 200 and text 461b that supports the adjustment instruction are superimposed on a live view image 501 captured by the imaging device 200 that is in the current installation state. The arrow 461a and the text 461b can be acquired from the terminal device 100 through communication between the imaging device 200 and the terminal device 100, The arrow 461a can be an arrow indicating an instruction for adjusting an adjustment element having a highest level of priority. The arrow 461a is indicating a direction in which the imaging device 200 is to be moved or rotated. The text 461b may include a description supplementing the instruction of the arrow 461a, like the description "please move to the right." Thus, the user can adjust an installation state of the imaging device 200 while viewing the live view image 501 captured by the imaging device 200.

When the user adjusts the imaging device 200 in accordance with the instruction indicated by the arrow 461a and the adjustment is confirmed, the terminal device 100 may present an instruction regarding an element having a second highest level of priority. Referring to FIG. 16B, the terminal device 100 causes the arrow 462a and text 462b indicating adjustment of an element having the second highest level of priority to be displayed as a result of a process of specifying the adjustment instruction of the imaging device 200 again. The arrow 462a indicates rotation around the y axis (pitch).

The text 462b may include a description supplementing the instruction of the arrow 462a, like the description "please make upward rotation." According, the user can adjust the installation states of the imaging devices 200 in order of levels of priority from highest to lowest while viewing the live view image 501 captured by the imaging device 200.

(Example in which instruction is output through LED of imaging device)

Figure 17:
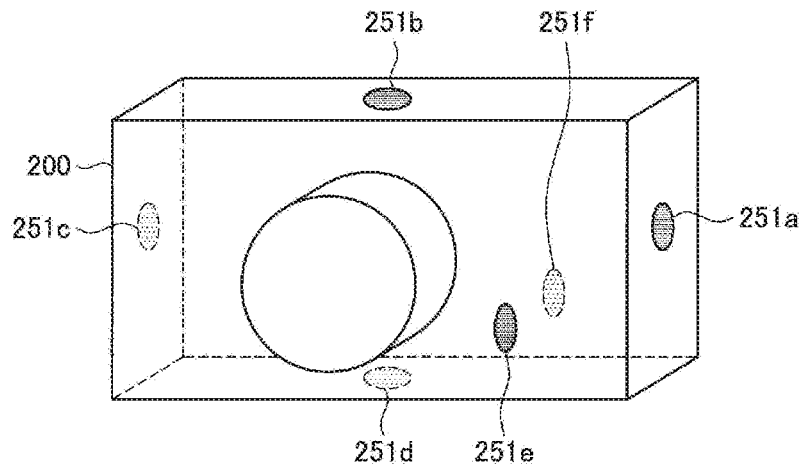
FIG. 17 is a diagram illustrating an example in which adjustment instructions are output to LEDs of the imaging device in the first embodiment.

FIG. 17 is a diagram illustrating an example in which adjustment instructions are output to LEDs of the imaging device 200 in the first embodiment. Referring to FIG. 17, LEDs 251a to 251s can be respectively installed on surfaces of a casing forming the imaging device 200. Note that the number of LEDs installed on the imaging device 200 is not limited. In the example illustrated in FIG. 17, each of the LEDs 251a to 251s is installed on one of the surfaces of the substantially rectangular parallelepiped casing. In this case, the number of LEDs installed per surface is not limited. In a case in which the user is making adjustment with respect to a certain element of the imaging device 20, the terminal device 100 may change a display mode of the LEDs of the imaging device 200 in accordance with a degree of approximation to a virtual installation state of the imaging device 200 assumed if the adjustment would be completed by an amount of adjustment for the element. For example, the LEDs 251 may display a direction in which adjustment is needed and a remaining degree of adjustment. More specifically, for example, in a case in which it is necessary to make adjustment of a parallel movement of the imaging device 200 to the right direction of the drawing, the LED 251a may be lit in a predetermined color. In addition, in a case in which adjustment of rotation around the lateral axis of the drawing (pitch) is necessary, the terminal device 100 may light the LED 251a and LED 251c in a different color from that of the parallel movement. In a case in which the user executes the adjustment of rotation and a rotation angle of the imaging device 200 shifts the device close to the appropriate installation state, the LEDs 251a and 251c may set to flicker, and a flickering speed of the LED 251a may set to increase as the rotation angle shifts the imaging device to be further close to the appropriate installation state. Note that, arbitrary colors can be set for lighting and flickering. Accordingly, the user can intuitively adjust the installation state of the imaging device 200 in accordance with such indications of the LEDs of the imaging device 200.

(Other output example)

Note that the terminal device 100 may present the user with an adjustment instruction using sounds, in addition to the above-described output examples. For example, the terminal device 100 may present a user with an element to be adjusted and a degree of adjustment using sound by giving an instruction of an adjustment element with a highest level of priority through sound. Accordingly, the user can recognize the instruction without visually checking a display of the terminal device 100. Note that, the sound of the instruction may be output from the imaging device 200. Accordingly, the user can more clearly recognize the sound from the imaging device 200 being adjusted. In addition, the terminal device 100 may present an instruction to the user by causing an external device other than the imaging device 200 to output an instruction specified by the adjustment instruction specification unit 123. For example, the terminal device 100 may cause the instruction to be displayed via an output device such as an external display.

<2. Second Embodiment>

Although the terminal device 100 specifies an instruction regarding adjustment of installation states of the plurality of imaging devices 200 in the information processing system 10 according to the first embodiment shown in FIG. 1, the present technology is not limited thereto. For example, the information processing system 10 may be configured to further include a server 300 in addition to the terminal device 100 and the imaging devices 200. A configuration of an information processing system 20 according to a second embodiment will be described below. Note that, since matters of the present embodiment except for the system configuration are similar to those of the above-described first embodiment, overlapping detailed description will be omitted.

Figure 18:
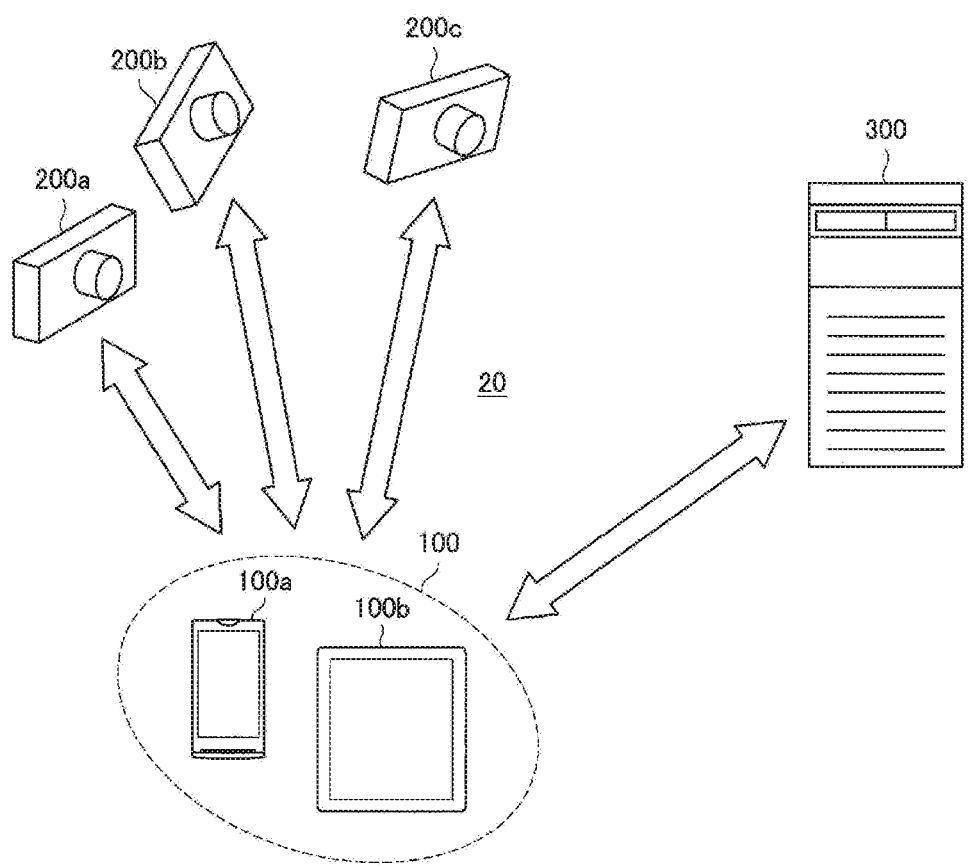
FIG. 18 is a diagram illustrating an example of a schematic configuration of an information processing system 10 according to a second embodiment.

FIG. 18 is a diagram illustrating an example of a schematic configuration of the information processing system 10 according to the second embodiment. Referring to FIG. 18, the information processing system 10 according to the second embodiment may include a terminal device 100, imaging devices 200, and a server 300. The server 300 is constituted by one or a plurality of information processing devices on a network. The information processing device(s) constituting the server 300 may include a processing circuit and a communication device. For example, with regard to information of captured images or current installation sates of the imaging devices 200 received from the terminal device 100 using the communication device, the server 300 may execute a process with respect to installation states of the imaging devices 200 using the processing circuit and transmit a processing result to the terminal device 100 using the communication device. In this case, the terminal device 100 that has received the processing result may output the processing result via an output device or transfer the processing result to the imaging devices 200.

The server 300 according to the present embodiment may have, for example, the adjustment element calculation unit 121, the priority level determination unit 122, the adjustment instruction specification unit 123, and the output control unit 124 that is included in the control unit 120 of the terminal device 100 according to the first embodiment. Thus, for example, the terminal device 100 may transmit the information of the captured images or current installation states received from the imaging device 200 to the server 300. At this time, the server 300 may execute a process with respect to the installation states of the imaging devices 200 with the captured images or current installation states and output a processing result to the terminal device 100. In addition, a live view image captured by the terminal device 100 may be acquired by the server 300, and the server 300 may superimpose the live view image on the processing result and output the result on the terminal device 100. That is, the server 300 may perform a process of specifying an adjustment instruction, and the terminal device 100 may play a role of an interface for the process of the server 300.

<3. Third Embodiment>

Figure 19:
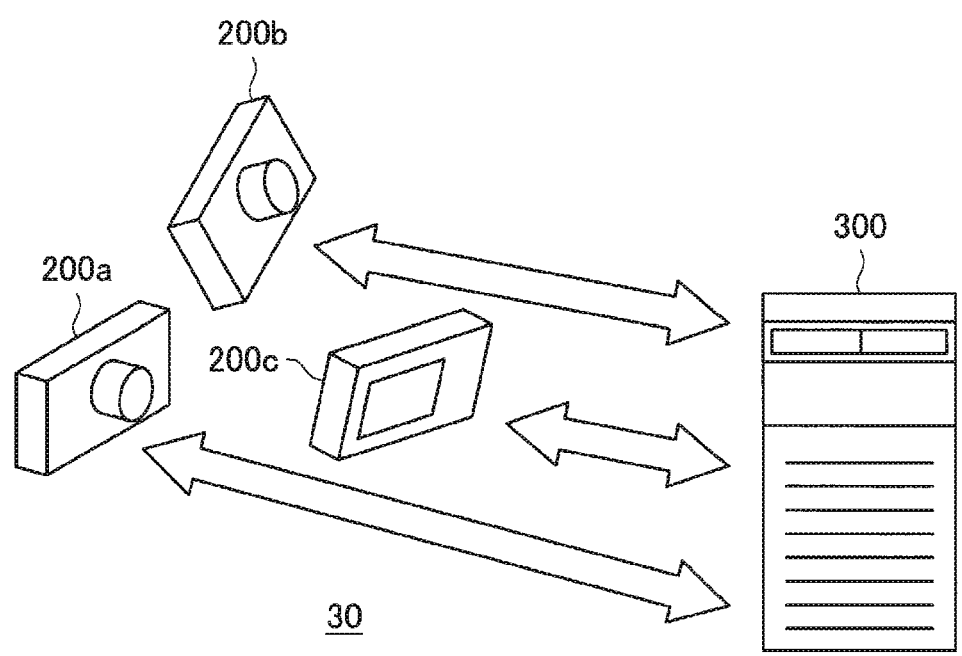
FIG. 19 is a diagram illustrating an example of a schematic configuration of an information processing system 10 according to a third embodiment.

In a case in which the imaging device 200 can directly communicate with the server 300, the information processing system 10 may have a configuration in which only the imaging devices 200 and the server 300 are included. FIG. 19 is a diagram illustrating an example of a schematic configuration of an information processing system 30 according to a third embodiment. Referring to FIG. 19, the information processing system 30 according to the third embodiment may include the imaging devices 200 and the server 300, in this configuration, the imaging device 200 may transmit information with respect to captured images or current installation states of the imaging devices 200 to the server 300 using a communication device and output a processing result acquired from the server 300 via an output device. In the example illustrated in FIG. 19, a processing result is output to an output device of the imaging device 200c that is capturing the imaging devices 200a and 200b. That is, the imaging device 200c can play a role of the terminal device 100 of the second embodiment. Note that, since matters of the present embodiment other than the system configuration are similar to those of the above-described first embodiment, overlapping detailed description will be omitted.

In addition, processes with respect to the imaging devices 200 may be performed by the imaging devices 200 themselves, rather than the server 300, in the present embodiment. In this case, the information processing system 10 may only include the imaging devices 200.

<4. Example of hardware configuration>

Next, a hardware configuration of an information processing device 900 according to an embodiment of the present disclosure will be described with reference to FIG. 20. FIG. 20 is a block diagram illustrating an example of the hardware configuration of the information processing device 900 according to an embodiment of the present disclosure. The illustrated information processing device 900 can realize, for example, the terminal device, the imaging devices, and the server of the above-described embodiments.

The information processing device 900 includes a CPU (Central Processing Unit) 901, a ROM (Read Only Memory) 903, and a RAM (Random Access Memory) 905. In addition, the information processing device 900 may include a host bus 907, a bridge 909, an external bus 911, an interface 913, an input device 915, an output device 917, a storage device 919, a drive 921, a connection port 923, and a communication device 925. Further, the information processing device 900 may include an imaging device 933, a sensor 935 and an LED 937 as necessary. The information processing a system 100 may include a processing circuit such as a DSP (Digital Signal Processor) or ASIC (Application Specific Integrated Circuit), alternatively or in addition to the CPU 901.

The CPU 901 serves as an operation processor and a control device, and controls all or some operations in the information processing device 900 in accordance with various programs recorded in the ROM 903, the RAM 905, the storage device 919 or a removable recording medium 927, The ROM 903 stores programs and operation parameters which are used by the CPU 901. The RAM 905 temporarily stores program which are used in the execution of the CPU 901 and parameters which are appropriately modified in the execution. The CPU 901, ROM 903, and RAM 905 are connected to each other by the host bus 907 configured to include an internal bus such as a CPU bus. In addition, the host bus 907 is connected to the external bus 911 such as a PCI (Peripheral Component Interconnect/Interface) bus via the bridge 909.

The input device 915 is a device which is operated by a user, such as a mouse, a keyboard, a touch panel, buttons, switches and a lever. The input device 915 may be, for example, a remote control unit using infrared light or other radio waves, or may be an external connection device 929 such as a portable phone operable in response to the operation of the information processing device 900. Furthermore, the input device 915 includes an input control circuit which generates an input signal on the basis of the information which is input by a user and Outputs the input signal to the CPU 901. By operating the input device 915, a user can input various types of data to the information processing device 900 or issue instructions for causing the information processing device 900 to perform a processing operation.

The output device 917 includes a device capable of visually or audibly notifying the user of acquired information. The output device 917 may include a display device such as an LCD (Liquid Crystal Display), a PDP (Plasma Display Panel), an OELD (Organic Electro-Luminescence Display), an audio output device such as, a speaker or a headphone, and a peripheral device such as a printer. The output device 917 may output the results obtained from the process of the information processing device 900 in a form of a video such as text or an image, and an audio such as voice or sound.

The storage device 919 is a device for data storage which is configured as an example of a storage unit of the information processing device 900. The storage device 919 includes, for example, a magnetic storage device such as a HDD (Hard Disk Drive), a semiconductor storage device such as a SSD (Solid State Drive), an optical storage device, or a magneto-optical storage device. The storage device 919 stores programs to be executed by the CPU 901, various data, and data obtained from the outside.

The drive 921 is a reader/writer for the removable recording medium 927 such as a magnetic disk, an optical disk, a magneto-optical disk, or a semiconductor memory, and is embedded in the information processing device 900 or attached externally thereto. The drive 921 reads information recorded in the removable recording medium 927 attached thereto, and outputs the read information to the RAM 905. Further, the drive 921 writes in the removable recording medium 927 attached thereto.

The connection port 923 is a port used to directly connect devices to the information processing device 900. The connection port 923 may include a USB (Universal Serial Bus) port, an IEEE 1394 port, and a SCSI (Small Computer System Interface) port. The connection port 923 may further include an RS-232C port, an optical audio terminal, an HIMI (High-Definition Multimedia Interface) port, and so on. The connection of the external connection device 929 to the connection port 923 makes it possible to exchange various data between the information processing device 900 and the external connection device 929.

The communication device 925 is, for example, a communication interface including a communication device or the like for connection to a communication network 931. The communication device 925 may be, for example, a communication card for a wired or wireless LAN (Local Area Network), Bluetooth (registered trademark), WUSB (Wireless USB) or the like. In addition, the communication device 925 may be a router for optical communication, a router for ADSL (Asymmetric Digital Subscriber Line), a modem for various kinds of communications, or the like. The communication device 925 can transmit and receive signals to and from, for example, the Internet or other communication devices based on a predetermined protocol such as TCP/IP. In addition, the communication network 931 connected to the communication device 925 may be a network or the like connected in a wired or wireless manner, and may be, for example, the Internet, a home LAN, infrared communication, radio wave communication, satellite communication, or the like.

The imaging device 933 is a device that generates an image by imaging a real space using an image sensor such as a charge-coupled device (CCD) or a complementary metal-oxide-semiconductor (CMOS) sensor, as well as various members such as one or more lenses for controlling the formation of a subject image on the image sensor, for example. The imaging device 933 may be a device that takes still images, and may also be a device that takes moving images.

The sensor 935 is any of various sensors such as a GPS (Grobal Positioning System) sensor, an acceleration sensor, a gyro sensor, a geomagnetic sensor, an optical sensor, or a sound sensor, for example. The sensor 935 acquires information regarding the state of the information processing device 900, such as the position or the orientation of the case of the information processing device 900, as well as information regarding the environment surrounding the information processing device 900, such as the brightness or noise surrounding the information processing device 900, for example.

The LED 937 is an example of a light emitting element. The LEI) 937 may be, for example, a semiconductor element that emits light in a predetermined color such as red, blue, or white. In addition, the LED 937 may be a semiconductor element that can emit light in a plurality of colors. A pattern of light emission such as lighting or flickering of the LED 937 is controlled by the CPU 901.

The foregoing thus illustrates an exemplary hardware configuration of the information processing apparatus 900. Each of the above components may be realized using general-purpose members, but may also be realized in hardware specialized in the function of each component. Such a configuration may also be modified as appropriate according to the technological level at the time of the implementation.

<5. Conclusion>

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Steps in processes executed by the information processing apparatus in this specification are not necessarily executed chronologically in the order described in a flow chart. For example, steps in processes executed by the information processing apparatus may be executed in a different order from the order described in a flow chart or may be executed in parallel.

In addition, a computer program for causing hardware such as a CPU, a ROM, and a RAM included in an information processing device to fulfill functions equivalent to those of the constituent elements of the information processing device that includes the above-described adjustment instruction specification unit or the like can also be produced. In addition, a storage medium in which the computer programs is stored may also be provided.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below:

(1)

An information processing device including:

an adjustment instruction specification unit configured to specify an instruction regarding adjustment by extracting or arranging elements of the adjustment in accordance with a level of priority of each of the elements for shifting current installation states of a plurality of imaging devices toward appropriate installation states of the plurality of imaging devices.

(2) The information processing device according to (1), further including:
a priority level determination unit configured to determine the level of priority on the basis of a parameter calculated for each of the elements with respect to the adjustment.

(3) The information processing device according to (2), in which the parameter includes an amount of adjustment of each of the elements.

(4) The information processing device according to (3), in which the amount of adjustment includes an amount of change in the adjustment of an attitude or a position of at least one imaging device included in the plurality of imaging devices.

(5) The information processing device according to any one of (2) to (4), in which the parameter includes a level of contribution of each of the elements with respect to image quality of an integrated image obtained by integrating images captured by the plurality of imaging devices.

(6) The information processing device according to (5), in which the level of contribution is calculated on the basis of a degree of deterioration in image quality of the integrated image that occurs when images captured by the plurality of imaging devices are corrected in a case in which the adjustment is executed without including the element.

(7) The information processing device according to (6), in which the priority level determination unit corrects images captured by the plurality of imaging devices that are in the current installation states for integration and calculates the level of contribution using degrees of deterioration in image quality that occur in the corrected images.

(8) The information processing device according to any one of (1) to (7), in which the adjustment instruction specification unit specifies the instruction by extracting an element with a highest level of priority among the elements.

(9) The information processing device according to (8),
in which the element includes adjustment of a position or an attitude of each of the plurality of imaging devices, and
the adjustment instruction specification unit specifies the instruction by extracting adjustment of a position or an attitude of at least one imaging device included in the plurality of imaging devices.

(10) The information processing device according to any one of (1) to (7), in which the adjustment instruction specification unit specifies the instruction by arranging the elements in order of levels of priority from highest to lowest.

(11) The information processing device according to any one of (1) to (10), in which the element includes a parallel movement component broken down into a direction of each coordinate axis in a spatial coordinate system.

(12) The information processing device according to any one of (1) to (11), in which the element includes a rotation component broken down into a direction of each coordinate axis in a spatial coordinate system.

(13) The information processing device according to any one of (1) to (12), further including:
an output control unit configured to control output of the instruction in accordance with the level of priority.

(14) The information processing device according to (13), in which the output control unit controls output of portions of the instruction corresponding to the elements in different forms in accordance with the levels of priority.

(15) The information processing device according to (13) or (14), in which the output control unit controls output of display showing the instruction along with a live view image captured by the imaging device.

(16) The information processing device according to any one of (13) to (15), in which, when adjustment is executed in accordance with the instruction, the output control unit controls change in a form of the instruction and output of the instruction in accordance with a degree of approximation of the imaging device to a virtual installation state of the imaging device specified using an amount of adjustment of at least one element indicated by the instruction.

(17) An information processing method including: specifying, by a processor, an instruction regarding adjustment by extracting or arranging elements of the adjustment in accordance with a level of priority of each of the elements for shifting current installation states of a plurality of imaging devices toward appropriate installation states of the plurality of imaging devices.

(18) A program causing a computer to function as: an adjustment instruction specification unit configured to specify an instruction regarding adjustment by extracting or arranging elements of the adjustment in accordance with a level of priority of each of the elements for shifting current installation states of a plurality of imaging devices toward appropriate installation states of the plurality of imaging devices.

REFERENCE SIGNS LIST

10 information processing system
100 terminal device
110 communication unit
120 control unit
121 adjustment element calculation unit
122 priority level determination unit
123 adjustment instruction specification unit
124 output control unit
130 imaging unit
140 input unit
150 output unit
200 imaging device
210 imaging unit
220 control unit
230 communication unit
240 installation state detection unit
250 output unit
251 LED
300 server

The invention claimed is:
1. An information processing device comprising:
a memory; and an electronic processor configured to
    determine a level of priority on a basis of a parameter calculated for each of two or more adjustment elements with respect to an imaging devices adjustment,
    extract the two or more adjustment elements of the imaging devices adjustment in accordance with the level of priority of the each of the two or more adjustment elements, the imaging devices adjustment shifts current installation states of a plurality of imaging devices toward appropriate installation states of the plurality of imaging devices, and
    specify an adjustment instruction to a user of the plurality of imaging devices based on the two or more adjustment elements that are extracted.

2. The information processing device according to claim 1, wherein the parameter includes an amount of an adjustment of each of the two or more adjustment elements.

3. The information processing device according to claim 2, wherein the amount of the adjustment includes an amount of change in the adjustment of an attitude or a position of at least one imaging device included in the plurality of imaging devices.

4. An information processing device comprising:
a memory; and
an electronic processor configured to
    determine a level of priority on a basis of a parameter calculated for each of one or more adjustment elements with respect to an imaging devices adjustment,
    extract the one or more adjustment elements of the imaging devices adjustment in accordance with the level of priority of the each of the one or more adjustment elements, the imaging devices adjustment shifts current installation states of a plurality of imaging devices toward appropriate installation states of the plurality of imaging devices, and
specify an adjustment instruction to a user of the plurality of imaging devices based on the one or more adjustment elements that are extracted
    wherein the parameter includes a level of contribution of each of the one or more adjustment elements with respect to image quality of an integrated image obtained by integrating images captured by the plurality of imaging devices.

5. The information processing device according to claim 4, wherein the level of contribution is calculated on the basis of a degree of deterioration in image quality of the integrated image that occurs when the images captured by the plurality of imaging devices are corrected in a case in which an adjustment is executed without including one of the one or more adjustment elements.

6. The information processing device according to claim 5, wherein the electronic processor is further configured to correct the images captured by the plurality of imaging devices that are in the current installation states for integration and calculates the level of contribution using degrees of deterioration in image quality that occur in the images that are corrected.

7. The information processing device according to claim 1, wherein the electronic processor is further configured to specify the adjustment instruction by selecting an adjustment element with a highest level of priority among the two or more adjustment elements.

8. The information processing device according to claim 7, wherein the adjustment element includes an adjustment of a position or an attitude of each of the plurality of imaging devices, and
    the electronic processor is further configured to
    extract an adjustment of a position or an attitude of at least one imaging device included in the plurality of imaging devices from the adjustment element, and
    specify the adjustment instruction based on the adjustment of the position or the attitude of the at least one imaging device.

9. The information processing device according to claim 1, wherein the electronic processor is further configured to
    arrange the two or more adjustment elements in an order of levels of priority from highest to lowest, and
    specify the adjustment instruction to the user of the plurality of imaging devices based on the order of the two or more adjustment elements.

10. The information processing device according to claim 1, wherein one of the two or more adjustment elements includes a parallel movement component broken down into a direction of each coordinate axis in a spatial coordinate system.

11. The information processing device according to claim 1, wherein one of the two or more adjustment elements includes a rotation component broken down into a direction of each coordinate axis in a spatial coordinate system.

12. The information processing device according to claim 9, wherein the electronic processor is further configured to control output of the adjustment instruction in accordance with the levels of priority.

13. The information processing device according to claim 12, wherein the electronic processor is further configured to output of portions of the adjustment instruction corresponding to the two or more adjustment elements in different forms in accordance with the levels of priority.

14. The information processing device according to claim 12, wherein the electronic processor is further configured to control an output of a display that displays the adjustment instruction along with a live view image captured by at least one of the plurality of imaging devices.

15. The information processing device according to claim 12, wherein, when the imaging devices adjustment is executed in accordance with the adjustment instruction, the electronic processor is further configured to
    control change in a form of the adjustment instruction, and
    output of the adjustment instruction in accordance with a degree of approximation of the at least one of the plurality of imaging devices to a virtual installation state of the at least one of the plurality of imaging devices specified using an amount of adjustment of at least one adjustment element indicated by the adjustment instruction.

16. An information processing method comprising:
determining, with an electronic processor, a level of priority on a basis of a parameter calculated for each of two or more adjustment elements with respect to an imaging devices adjustment;
extracting, with the electronic processor, the two or more adjustment elements of the imaging devices adjustment in accordance with the level of priority of the each of the two or more adjustment elements, the imaging devices adjustment shifts current installation states of a plurality of imaging devices toward appropriate installation states of the plurality of imaging devices; and specifying, with the electronic processor, an adjustment instruction to a user of the plurality of imaging devices based on the two or more adjustment elements that are extracted.

17. A non-transitory computer-readable medium comprising a program that, when executed by an electronic processor, causes the electronic processor to perform a set of operations comprising:
   determining a level of priority on a basis of a parameter calculated for each of two or more adjustment elements with respect to an imaging devices adjustment;
   extracting the two or more adjustment elements of the imaging devices adjustment in accordance with the level of priority of the each of the two or more adjustment elements, the imaging devices adjustment shifts current installation states of a plurality of imaging devices toward appropriate installation states of the plurality of imaging devices; and
   specifying an adjustment instruction to a user of the plurality of imaging devices based on the two or more adjustment elements that are extracted.

18. The information processing method according to claim 16, wherein the parameter includes a level of contribution of each of the two or more adjustment elements with respect to image quality of an integrated image obtained by integrating images captured by the plurality of imaging devices.

19. The non-transitory computer-readable medium according to claim 17, wherein the parameter includes a level of contribution of each of the two or more adjustment elements with respect to image quality of an integrated image obtained by integrating images captured by the plurality of imaging devices.

* * * * *